(12) United States Patent
Yamamoto

(10) Patent No.: US 7,587,795 B2
(45) Date of Patent: Sep. 15, 2009

(54) FLAT CABLE BENDING HOLDER

(75) Inventor: Masataka Yamamoto, Kosai (JP)

(73) Assignee: Yazaki Corporation, Tokyo (JP)

( * ) Notice: Subject to any disclaimer, the term of this patent is extended or adjusted under 35 U.S.C. 154(b) by 242 days.

(21) Appl. No.: 11/546,280

(22) Filed: Oct. 12, 2006

(65) Prior Publication Data

US 2007/0087620 A1    Apr. 19, 2007

(30) Foreign Application Priority Data

Oct. 13, 2005  (JP)  ............................ P2005-298542
Nov. 14, 2005  (JP)  ............................ P2005-328930

(51) Int. Cl.
*A44B 21/00* (2006.01)
*H02G 3/02* (2006.01)
*H02G 15/007* (2006.01)
*H01B 7/08* (2006.01)
*H02G 3/04* (2006.01)
*B60R 16/02* (2006.01)

(52) U.S. Cl. .................. 24/129 R; 174/117 F; 248/74.4
(58) Field of Classification Search .............. 24/129 R; 174/113 R, 135, 88 R, 15.5, 99 R, 97, 117 FF, 174/177 F, 60; 248/74.4; 439/498, 459
See application file for complete search history.

(56) References Cited

U.S. PATENT DOCUMENTS

| 4,406,916 A | * | 9/1983 | Southerland ................. 174/135 |
| 6,575,411 B1 | * | 6/2003 | Serizawa et al. .......... 174/117 F |
| 6,667,441 B2 | * | 12/2003 | Steinhauer .................. 248/74.3 |

FOREIGN PATENT DOCUMENTS

| JP | 7-31043 A | 1/1995 |
| JP | 10-92238 A | 4/1998 |

* cited by examiner

*Primary Examiner*—Robert J Sandy
(74) *Attorney, Agent, or Firm*—Sughrue Mion, PLLC

(57) ABSTRACT

A flat cable bending holder which includes a plate which has a bending reference side at an outer edge thereof and in which a flat cable is mounted on a front surface and on a rear surface of the plate, holding pieces which are provided on the front surface and the rear surface of the plate and hold the flat cables along the front surface and the rear surface of the plate, and restricting portions which are provided on the plate and are positioned at the outer edges of the flat cables which extend at a predetermined narrow angle to restrict an angle at which the flat cables enter and exit the flat cable bending holder.

12 Claims, 18 Drawing Sheets

FLAT CABLE BENDING HOLDER

BACKGROUND OF THE INVENTION

1. Technical Field

The present invention relates to a flat cable bending holder used when a flat cable having flexibility, such as a flexible flat cable (FFC) or a ribbon-shaped electrical cable, is wired in a vehicle such as a car, and more particularly, to a flat cable bending holder used when a flat cable is bent to change the wiring direction thereof.

2. Description of the Related Art

For example, in order to change the wiring direction of a flat cable which is wired in a vehicle such as a car, the flat cable is often bent at a predetermined angle. As means for bending the flat cable, there is known a bending fixture shown in FIGS. 26(a) to 26(c) or a bending fixture shown in FIG. 27(a) to 27(c).

FIGS. 26(a) to 26(c) are disclosed in JP10-A-92238, wherein FIG. 26(a) shows the configuration of the fixture and FIGS. 26(b) and 26(c) show a procedure for fixing a flat cable using the fixture shown in FIG. 26(a).

A flat cable fixture 1 includes two pinch plates 2 which pinch a flat cable FC. The pinch plate 2 has a substantially right triangle shape, a hinge 4 for coupling two pinch plates 2 is provided on one sides of the pinch plates which connect right-angle portions, and a lock potion 5 for locking the two pinch plates 2 is provided on an edge of the pinch plate which faces the hinge 4. A slope side 3 of the right triangle is sloped at an angle corresponding to the bending angle of the flat cable FC.

When the fixture 1 is used, first, the flat cable FC is inserted between the two pinch plates 2 and the lock portion 5 is fixed such that the fixture 1 is attached to the middle portion of the longitudinal direction of the flat cable FC, as shown in FIG. 26(b). At this time, a bending planned line of the flat cable FC is positioned to the slope side 3. Next, as shown in FIG. 26(c), the flat cable FC is bent at the position of the slope side 3. In this state, a fixing portion (not shown) of the fixture 1 is locked to the vehicle to fix a bent portion of the flat cable FC.

In the flat cable fixture 1, the shape of the bent flat cable cannot be stably held by a single component.

And, in the flat cable, the bent shape cannot be stably held by a unit component. Accordingly, it is difficult to perform a next work, for example, when fixing the fixture to the vehicle body.

FIGS. 27(a) to 27(c) are disclosed in JP7-A-31043, wherein FIGS. 27(a), 27(b) and 27(c) show a procedure for fixing a flat cable using the fixture.

A flat cable fixture 10 has three right-triangle shaped pinch plates (a first pinch plate 11, a second pinch plate 12 and a third pinch plate 13) which pinch a flat cable FC, one sides of the first pinch plate 11 and the second pinch plate 12, which connect right-angle portions, are coupled by a hinge 14 having a small width, and oblique sides of the second pinch plate 12 and the third pinch plate 13 are coupled by a hinge 15 having a large width. Lock portions 16 and 17 for fixing the first pinch plate 11 and the second pinch plate 12 are provided on the edges of the first pinch plate 11 and the second pinch plate 12 which face the hinge 14. Lock portions 18 and 19 for fixing the first pinch plate 11 and the third pinch plate 13 are provided on the right-angle portions of the first pinch plate 11 and the third pinch plate 13.

When this fixture 10 is used, first, the three pinch plates 11, 12 and 13 are exploded (FIG. 27(a)), the flat cable FC is inserted between the second pinch plate 12 and the first flat cable 11, and the lock portions 16 and 17 are fixed (FIG. 27(b)). Next, the flat cable FC is bent at the position of the slope side of the first pinch plate 11, the third pinch plate 12 overlaps thereon, the bent flat cable FC is inserted between the first pinch plate 11 and the third pinch plate 13, and the lock portions 18 and 19 are fixed (FIG. 27(c)).

In the flat cable fixture 10, the shape of the bent flat cable can be stably held by a single component.

However, in the above-described conventional flat cable fixtures, the bending angle of the flat cable is fixed. Accordingly, when the flat cable is desired to be bent at a different angle, the conventional flat cable fixtures cannot be used. Thus, when the flat cable is wired, various flat cable fixtures having different bending angles must be prepared and a fixture having a suitable bending angle must be selected, thereby deteriorating workability deteriorates and increasing cost.

SUMMARY OF THE INVENTION

The present invention is made in view of the above-described problems, and it is an object of the present invention to provide a flat cable bending holder capable of easily and properly bending a flat cable and stably holding a bent shape.

In order to accomplish the above-described object, a flat cable bending holder according to the present invention has the following characteristics (1) to (11).

(1) The flat cable bending holder includes: a plate which has a straight-line shaped bending reference side for positioning a bent line when bending a flat cable at an outer circumferential edge thereof and in which a flat cable of a front side of the bent line is mounted on the front surface of a plate plane and a flat cable of the rear side of the bent line is mounted on the rear surface of the plate plane; holding pieces which are provided on the front surface and the rear surface of the plate and hold the flat cables of the front side and the rear side of the bent line along the front surface and the rear surface of the plate, respectively; and restricting portions which are provided on the plate and are positioned at the outer edges of the flat cables of the front side and the rear side of the bent line which extend at a predetermined narrow angle to restrict outward bound of the flat cables of the front side and the rear side which are held by the holding pieces.

(2) In the flat cable bending holder having the configuration of (1), at lest one of the holding pieces formed on the front surface and the rear surface of the plate is provided as a pinch plate for pinching the flat cable between the holding piece and the plate and is cantilever-supported by a support portion which combines with the restricting portion at a gap for allowing the flat cable to be inserted between the plate and the holding piece, and an insertion slot for inserting the flat cable between the holding piece and the plate is formed on the side of a free end of the holding piece.

(3) In the flat cable bending holder having the configuration of (2), a positioning projection which is engaged with a hole of the flat cable to position the flat cable in a longitudinal direction is provided on the plate plane of the plate.

(4) In the flat cable bending holder having the configuration of (2) or (3), a groove into which a convex portion of the front surface of the flat cable is inserted is formed on the lower surface of the holding piece provided as the pinch plate.

(5) In the flat cable bending holder having the configuration of (1), at lest one of the holding pieces formed on the front surface and the rear surface of the plate is provided as a penetration plate which penetrates through a penetrated hole formed in the flat cable and positions and holds the flat cable in a longitudinal direction and is cantilever-supported by a support portion which combines with the restricting portion at a gap for allowing the flat cable to be inserted between the plate and the holding piece, and an insertion slot for inserting the flat cable between the holding piece and the plate are formed on the side of a free end of the holding piece.

(6) In the flat cable bending holder having the configuration of (5), grooves into which a convex portion of the front surface of the flat cable is inserted are formed in the upper surface and the lower surface of the holding piece provided as the penetration plate.

(7) In the flat cable bending holder having the configuration (5) or (6), the free end of the holding piece provided as the penetration plate is formed in a comb-shaped cross-sectional shape.

(8) In the flat cable bending holder having any one configuration of (2) to (7), a removal preventive projection for preventing the flat cable inserted between the plate and the holding piece from being removed through the insertion slot is provided on the insertion slot or an extension of the insertion slot.

(9) In the flat cable bending holder having any one configuration of (1) to (8), the plate has an L shape when viewing the plane having a pair of belt-plate shaped sleeve portions on which the flat cable of the front side of the bent line and the flat cable of the rear side of the bent line are mounted, respectively, an outer circumferential corner of the L-shaped plate is cut in an oblique line of the extension directions of the sleeve portions, and an edge cut in the oblique line is formed as the bending reference side having a length equal to or larger than that of the bent line.

(10) In the flat cable bending holder having the configuration of (9), a tape-winding concave portion for winding a tape on the flat cable together with the sleeve portion is provided in at least one of the sleeve portion.

(11) In the flat cable bending holder having any one configuration of (1) to (10), mounting surfaces which have a height equal to or larger than that of the holding piece and stably come into contact with a flat mounted-surface are provided on the front surface and the rear surface of the plate, around a position in which the flat cable is mounted and a work space for engaging the flat cable with the holding piece.

According to the flat cable bending holder having the configuration of (1), since the holding pieces for holding the flat cable of the front side of the bent line and the flat cable of the rear side of the bent line on the front surface and the rear surface of the plate having the bending reference side at the outer circumferential edge, it is possible to easily bend the flat cable while positioning the bent line to the bending reference side and to securely hold the bent shape only using the holder. In the case of bending the flat cable having strong springback, an outward bounding force is generated in the bent flat cable, but the restricting portion for restricting the outward bounding force of the flat cable is mounted on the plate and, as a result, the flat cable can be securely held by the holding pieces at proper positions. Thus, shape holding performance in the bent state is improved and the holder is easily mounted in the vehicle body after bending.

According to the flat cable bending holder having the configuration of (2), the flat cable can be easily held only by inserting the flat cable between the plate and the holding piece provided as the pinch plate. In this case, since the holding piece is cantilever-supported using the restricting portions located at the outer edges of the flat cables of the front side and the rear side of the bent line as the support portion, the flat cable can be easily inserted between the holding piece and the plate through the inside (inside of the narrow angle) of the free end of the holding piece.

According to the flat cable bending holder having the configuration of (3), when the positioning projection of the plate is engaged with the hole of the flat cable, it is possible to easily position the flat cable in the longitudinal direction. Accordingly, it is possible to properly determine the bent position only using the holder. In this case, the hole of the flat cable may be initially formed in an insulator of the flat cable or may be formed by thrusting the positioning projection of the plate into the insulator of the flat cable together at the same time of the engagement.

According to the flat cable bending holder having the configuration of (4), since the groove into which the convex portion of the front surface of the flat cable is inserted is formed in the lower surface of the holding piece provided as the pinch plate, even the flat cable having the convex conductor-disposing portion can be closely adhered to the flat cable and, as a result, the flat cable can be stably held without play.

According to the flat cable bending holder having the configuration of (5), since the holding piece provided as the penetration plate penetrates through the penetrated hole formed in the flat cable, it is possible to easily hold the flat cable on the plate while positioning the flat cable in the longitudinal direction. Accordingly, it is possible to properly determine the bent position only using the holder. Since the holding piece is cantilever-supported using the restricting portions located at the outer edges of the flat cables of the front side and the rear side of the bent line as the support portion, a portion of the width direction of the flat cable which is disposed below the holding piece by penetrating the holding piece through the penetrated hole can be easily inserted between the holding piece and the plate through the inside (inside of the narrow angle) of the free end of the holding piece and, as a result, the flat cable can be held between the holding piece and the plate.

According to the flat cable bending holder having the configuration of (6), since the grooves into which the convex portion of the front surface of the flat cable is inserted are formed in the upper surface and the lower surface of the holding piece provided as the penetration plate, even in the flat cable having the convex conductor-disposing portion, the holding piece can be closely adhered to the flat cable located on the upper surface and the lower surface of the holding piece by penetrating the holding piece through the penetrate hole of the flat cable, and, as a result, the flat cable can be stably held without play.

According to the flat cable bending holder having the configuration of (7), since the free end of the holding piece provided as the penetration plate is formed in the comb-shaped cross-sectional shape, the holding piece is easy to penetrate through the penetrated hole of the flat cable and is hard to be removed therefrom after penetrating through the penetrated hole.

According to the flat cable bending holder having the configuration of (8), since the removal preventive projection is provided on the insertion slot or the extension of the insertion slot, it is possible to securely prevent the flat cable inserted between the plate and the holding piece from being removed through the insertion slot.

According to the flat cable bending holder having the configuration of (9), since the bending reference side is provided by forming the plate having the L shape when viewing the plane having the left and right sleeve portions and obliquely cutting the outer circumferential corner, it is possible to economically obtain the compact holder.

According to the flat cable bending holder having the configuration of (10), it is possible to securely wind the tape at a proper position when the flat cable is fixed by the tape winding.

According to the flat cable bending holder having the configuration of (11), since the mounting surfaces having the height equal to or larger than that of the holding piece are provided on the plate, the mounting surfaces come into contact with the flat mounted-surface and, as a result, the holding piece can be stably mounted without play.

According to the present invention, it is possible to provide a flat cable bending holder capable of easily and properly bending a flat cable and stably holding a bent shape.

Up to now, the present invention was briefly described. The present invention will become more apparent by reading preferred embodiments of the present invention described below with reference to the accompanying drawings.

Also, the present invention is made in view of the above-described problems, and it is an object of the present invention to provide a flat cable bending holder capable of accurately holding a flat cable at a plurality of bending angles.

In order to accomplish the above-described object, a flat cable bending holder according to the present invention has the following characteristics (12) to (19).

(12) The flat cable bending holder includes: a first holding portion which holds a flat cable before bending; a base portion which includes a plate-shaped base body having an oblique side and allows the flat cable to be bent from one surface to the other surface of the base body on the oblique side; and a second holding portion which holds the flat cable bent on the base portion, wherein the second holding portion has a plurality of holding parts which holds the flat cable and the bending angles of the flat cable on the base portion when the holding parts hold the flat cable are different from one another.

(12) In the flat cable bending holder having the configuration of (13), the first holding portion includes a first sidewall for restricting a repulsive force of the flat cable for expanding the bending angle, a first support portion having a support surface which is in contact with one surface of the flat cable, and a first locking portion which has a locking surface which is in contact with the other surface of the flat cable and has one side supported by the first sidewall, and the second holding portion includes a second sidewall for restricting the repulsive force of the flat cable, a second locking portion which has locking surfaces which are in contact with one surface of the bent flat cable in correspondence with the holding parts and has one side supported by the second sidewall, and a second support portion which has support surfaces which are in contact with the other surface of the bent flat cable in correspondence with the holding parts and has step differences for restricting the repulsive force of the flat cable on boundaries between the support surfaces.

(14) In the flat cable bending holder having the configuration of (13), the first support portion, the first locking portion and the base body are arranged between the first support portion and the first locking portion and between the first locking portion and the base body at gaps through which the flat cable passes, and the base body, the second locking portion and the second support portion are arranged between the base body and the second locking portion and between the second locking portion and the second support portion at gaps through which the flat cable passes.

(15) In the flat cable bending holder having the configuration of (13) or (14), projections which penetrate through the flat cable to position the flat cable on the support surface are provided on the support surfaces of the first support portion and the second support portion, respectively.

(16) In the flat cable bending holder having the configuration of (13) to (15), grooves into which projection strips of the flat cable are inserted are provided in the locking surfaces of the first locking portion and the second locking portion, respectively.

(17) In the flat cable bending holder having the configuration of (13) to (16), each of the support surfaces of the second support portion tapers such that the thickness of the second support portion gradually decreases toward the second sidewall and the step differences of the second support portion are generated by terminating the taper on the boundaries between adjacent support surfaces.

(18) In the flat cable bending holder having the configuration of (13) to (17), each of the locking surfaces of the second locking portion tapers such that the thickness of the second locking portion gradually decreases toward an free end of the locking portion and step differences for restricting the exit of the flat cable are generated on the boundaries between adjacent locking surfaces.

(19) In the flat cable bending holder having the configuration of (13) to (18), a projection portion which has a slope surface to gradually increase the thickness thereof toward the free end is provided at a position adjacent to the first support portion or a free end of the first locking portion of the base portion and a position adjacent to the second support portion or a free end of the second locking portion of the base portion.

According to the flat cable bending holder having the configuration of (12), since the plurality of holding parts for holding the flat cable is provided on the second holding portion, it is possible to bend the flat cable at various bending angles by selecting the holding parts when the flat cable is bent.

According to the flat cable bending holder having the configuration of (13), since the first holding portion includes the first sidewall for restricting the repulsive force of the flat cable for expanding the bending angle, the first support portion, and the first locking portion having one side supported by the first sidewall, and the second holding portion includes the second sidewall for restricting the repulsive force of the flat cable, the second locking portion having one side supported by the second sidewall, and the second support portion having the step differences for restricting the repulsive force of the flat cable on boundaries between the support surfaces, it is possible to accurately set the bending angle of the flat cable to a predetermined angle using the repulsive force of the flat cable. It is possible to prevent the flat cable from exiting from the first and second locking portions only by inserting the flat cable from the free ends of the first locking portion and the second locking portion.

According to the flat cable bending holder having the configuration of (14), since the first support portion, the first locking portion and the base body are arranged at the gaps through which the flat cable passes and the base body, the second locking portion and the second support portion are arranged at the gaps through which the flat cable passes, the flat cable before bending is inserted and held among the first support portion, the first locking portion and the base body to be brought into contact with the support surface of the first support portion, the locking surface of the first locking portion and one surface of the base body and the flat cable after bending is inserted and held among the base body, the second locking portion and the second support portion to be brought into contact with the other surface of the base body, the locking surface of the second locking portion and the support surface of the second support portion.

According to the flat cable bending holder having the configuration of (15), since the projections which penetrate through the flat cable are provided on the support surfaces of the first support portion and the second support portion, respectively, it is possible to accurately position the flat cable on the support surfaces.

According to the flat cable bending holder having the configuration of (16), since the grooves into which the projection strips of the flat cable are inserted are provided in the locking surfaces of the first locking portion and the second locking portion, respectively, it is possible to accurately position the flat cable on the locking surfaces.

According to the flat cable bending holder having the configuration of (17), since each of the support surfaces of the second support portion tapers such that the thickness of the second support portion gradually decreases toward the second sidewall and thus the step differences are generated on the second support portion, it is possible to form the step differences without increasing the thickness of the second support portion.

According to the flat cable bending holder having the configuration of (18), since each of the locking surfaces of the second locking portion tapers such that the thickness of the second locking portion gradually decreases toward the free end of the locking portion and the step differences for restricting the exit of the flat cable are generated on the second locking portion, it is possible to form the step differences without increasing the thickness of the second locking portion.

According to the flat cable bending holder having the configuration of (19), since the projection portion which has a slope surface to gradually increase the thickness thereof toward the free end is provided at positions adjacent to the free ends of the first and second locking portions, the flat cable is inserted from the free end of the locking portion without an obstacle and the flat cable is prevented from exiting from the free end of the locking portion.

A flat cable bending holder according to the present invention can accurately hold a flat cable at a plurality of bending angles and stably hold the angles. Accordingly, when the flat cable is wired, a plurality of flat cable fixtures need not be prepared and, as a result, workability can be improved and cost can decrease.

Up to now, the present invention was briefly described. The present invention will become more apparent by reading preferred embodiments of the present invention described below with reference to the accompanying drawings.

BRIEF DESCRIPTION OF THE DRAWINGS

FIG. 26 is a view showing a conventional bending fixture, wherein FIG. 26(a) shows the configuration of the fixture and FIGS. 26(b) and 26(c) show a procedure for using the fixture.

FIG. 27 is a view showing another conventional bending fixture, wherein FIGS. 27(a) to 27(c) shows a procedure for fixing a flat cable using the fixture.

DESCRIPTION OF THE PREFERRED EMBODIMENTS

Hereinafter, flat cable bending holders according to a first embodiment, a second embodiment, a third embodiment and a fourth embodiment, a fifth embodiment of the present invention will be described in detail with reference to the accompanying drawings.

A flat cable in which a flat cable bending holder according to the present invention is mounted, as described above, for example, includes a main body having flexibility, such as a flexible flat cable (FFC) or a ribbon-shaped electrical cable. In the embodiment of the flat cable bending holder according to the present invention, the flat cable bending holder mounted in the FFC will be described.

That is, each of the flat cable bending holders according to the embodiments of the present invention is used in the FFC which includes a plurality of electrical cable portions arranged in parallel, bridge portions which are integrally formed on insulating covers so as to connect the insulating covers of the plurality of electrical cable portions with one another and slit-shaped penetrated holes formed in the bridge portions.

More specifically, the FFC used in the embodiments of the present invention includes four electrical cable portions each including a conductive portion having at least one conductive wire and an insulating cover for covering the outer circumferential surface of the conductive portion, three strip-shaped bridge portions which are integrally formed on the insulating covers so as to connect the insulating covers of the electrical cable portions with each other in parallel and slit-shaped through holes formed in the bridge portions by punching the bridge portions in a longitudinal direction.

First Embodiment

Figure 1:
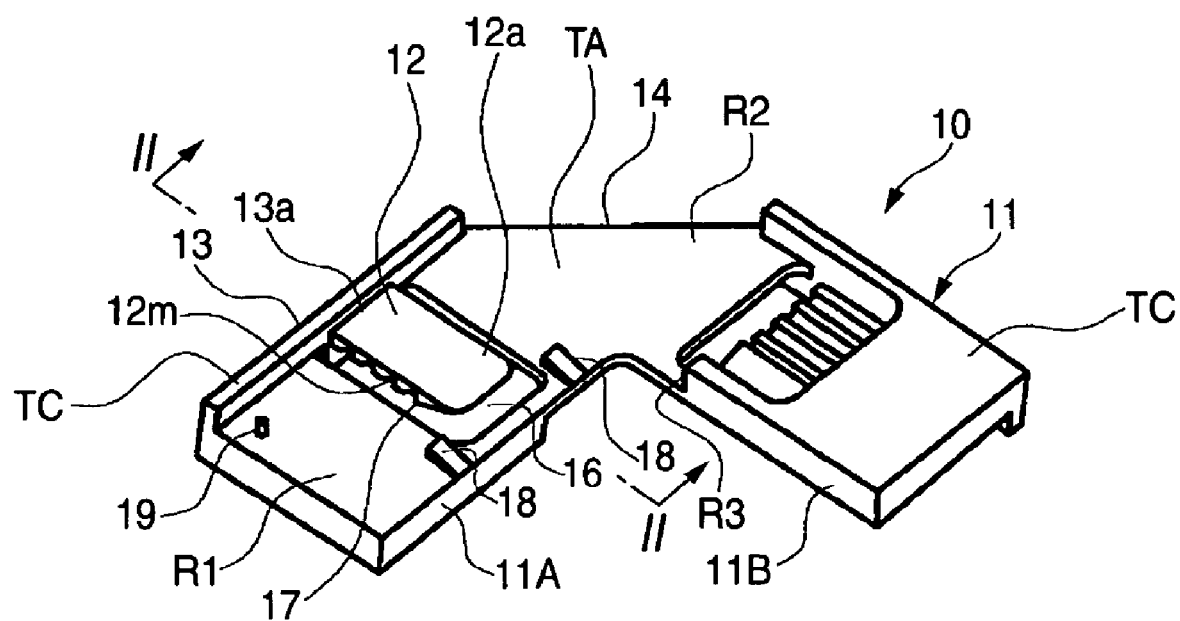
FIG. 1 is a perspective view showing a flat cable bending holder according to a first embodiment of the present invention, viewed from the front surface thereof.
Figure 2:
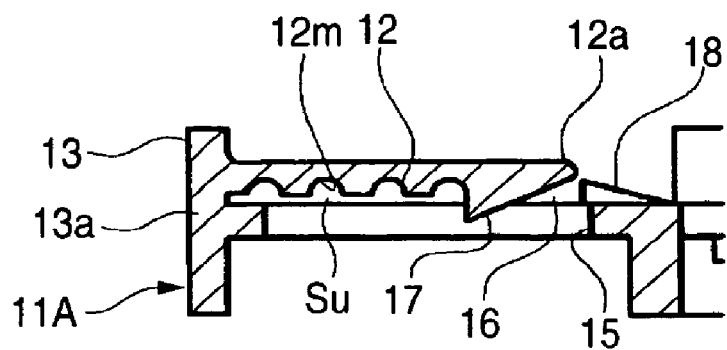
FIG. 2 is a cross-sectional view taken along line II-II of FIG. 1.
Figure 3:
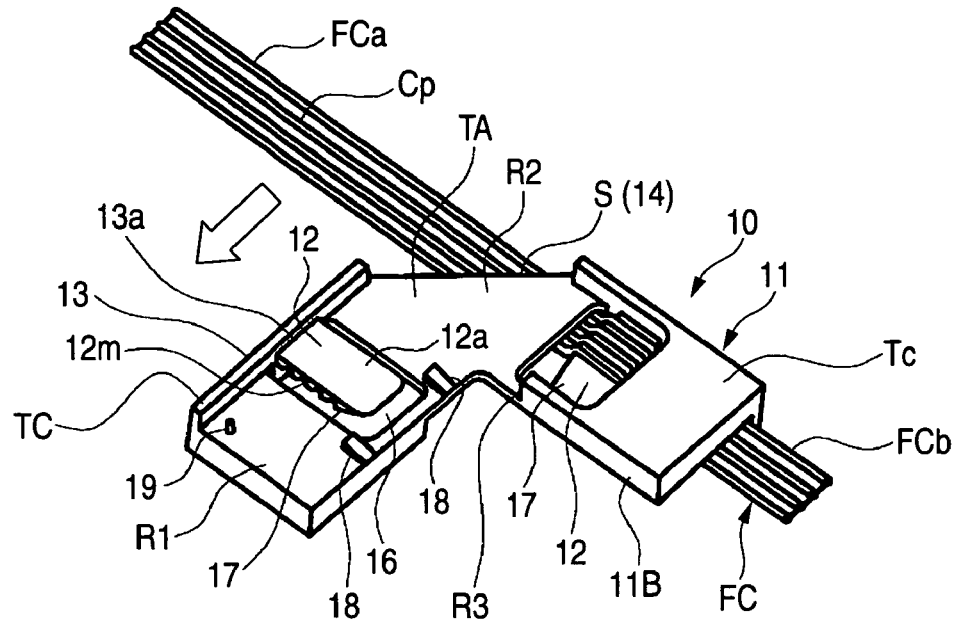
FIG. 3 is a perspective view showing a state that a flat cable is provided on the rear surface of the bending holder, viewed from the front surface thereof.
Figure 4:
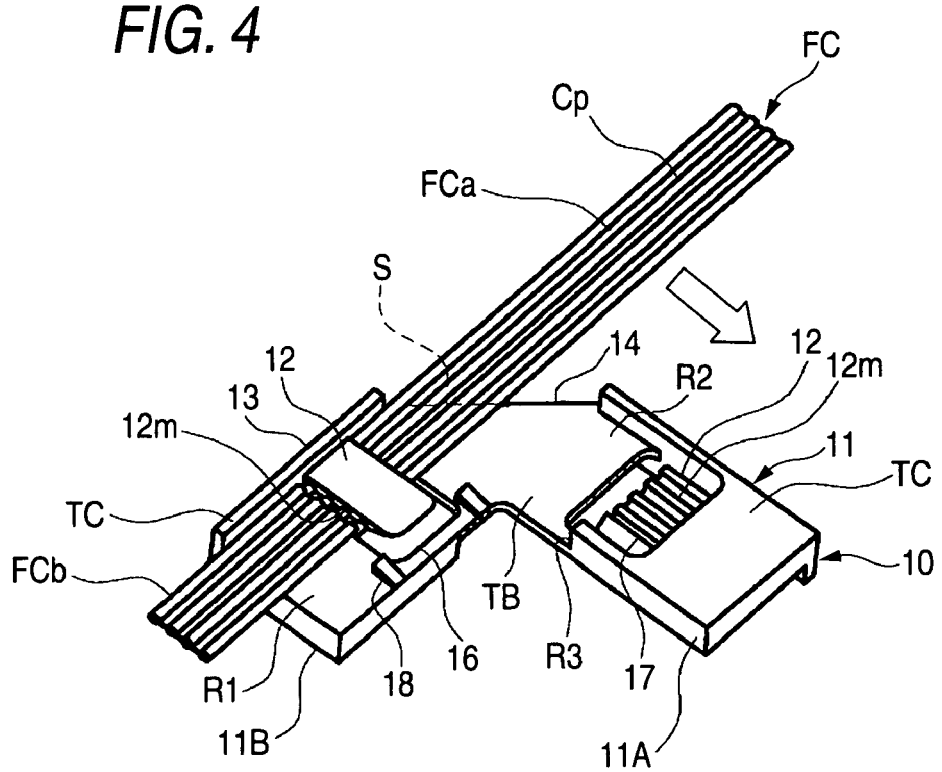
FIG. 4 is a perspective view showing the state of FIG. 3 viewed from the rear surface thereof.
Figure 5:
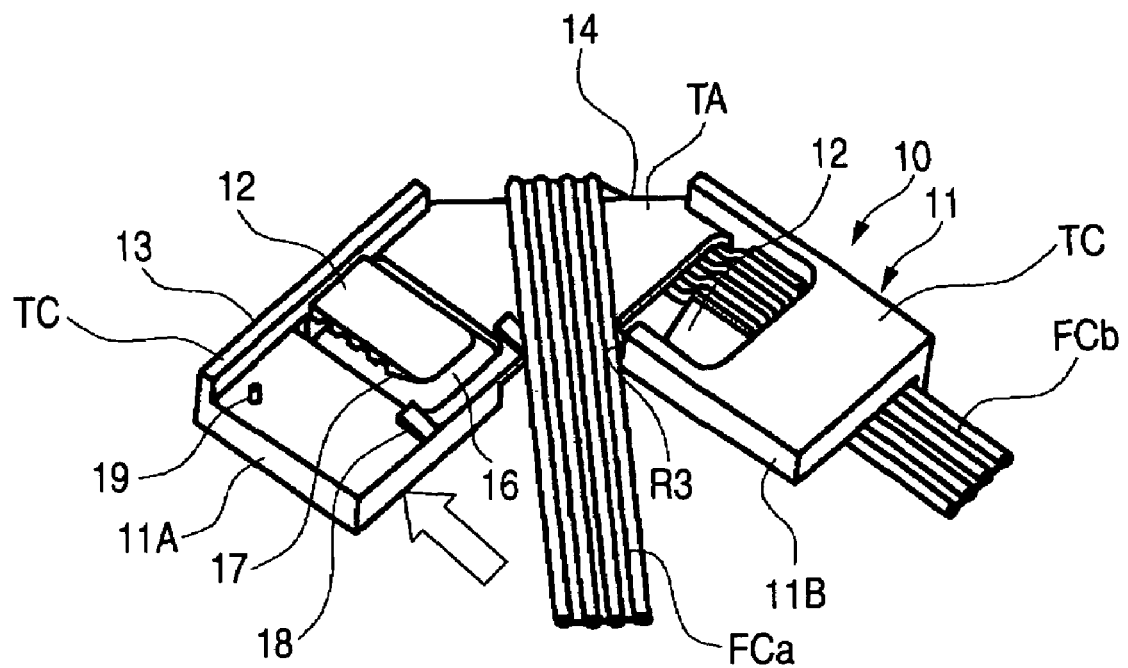
FIG. 5 is a perspective view showing a state that the flat cable is being bent on the front surface of the bending holder as a next operation of FIG. 3, viewed from the front surface thereof.
Figure 6:
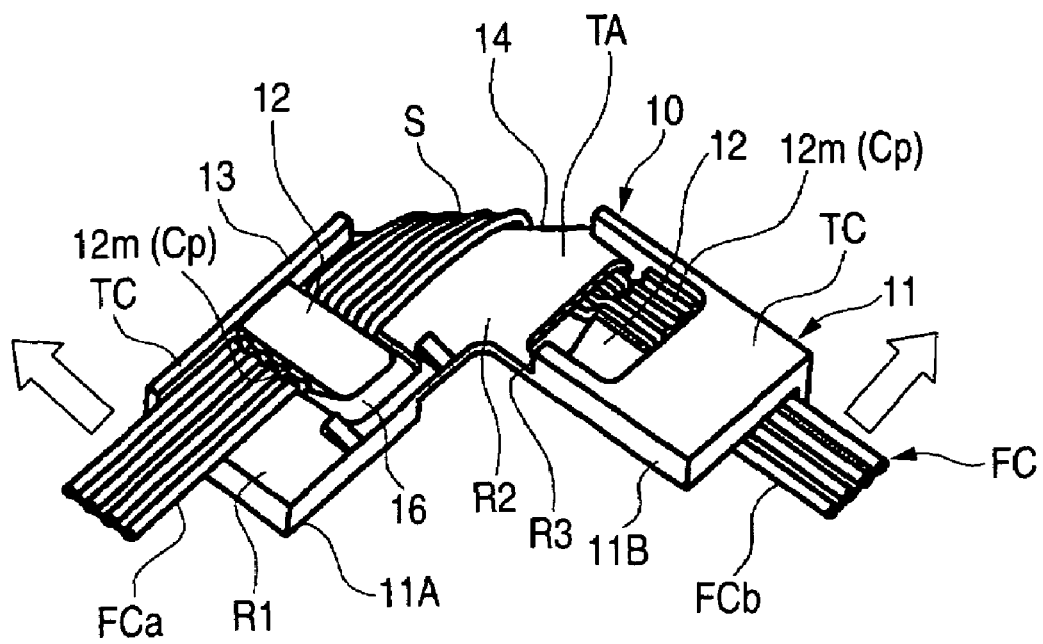
FIG. 6 is a perspective view showing a state that bending is finished on the bending holder, viewed from the front surface thereof.

FIGS. 1 to 6 show a flat cable bending holder according to a first embodiment, wherein FIG. 1 is a perspective view showing the flat cable bending holder viewed from the front surface thereof, FIG. 2 is a cross-sectional view taken along line II-II of FIG. 1, FIG. 3 is a perspective view showing a state that a flat cable is provided on the rear surface of the bending holder, viewed from the front surface thereof, FIG. 4 is a perspective view showing the state of FIG. 3 viewed from the rear surface thereof, FIG. 5 is a perspective view showing a state that the flat cable is being bent on the front surface of the bending holder as a next operation of FIG. 3, viewed from the front surface thereof, and FIG. 6 is a perspective view showing a state that bending is finished on the bending holder, viewed from the front surface thereof.

As shown in FIG. 1, the flat cable bending holder 10 is a monolithically molded product made of plastic and includes a plate 11, holding pieces 12 and restricting portions 13.

The plate 11 has a straight-line shaped bending reference side 14 for positioning a bent line S when bending a flat cable FC at its outer circumferential edge, a flat cable FCa of the front side of the bent line S is mounted on the front surface TA of the plate plane, and a flat cable FCb of the rear side of the bent line S is mounted on the rear surface TB of the plate plane. The bent line S is a straight line which obliquely crosses the longitudinal direction of the flat cable FC, that is, a virtual straight line located at a position in which the flat cable will be bent.

The plate 11 has an L shape when viewing the plane having a pair of belt-plate shaped sleeve portions 11A and 11B on which the flat cable FCa of the front side of the bent line S and the flat cable FCb of the rear side of the bent line S are mounted, respectively, the outer circumferential corner of the L-shaped plate 11 is cut in an oblique line of the extending directions of the sleeve portions 11A and 11B, and the edge cut in the oblique line is formed as the bending reference side 14 having a length equal to or larger than that of the bent line S.

The holding pieces 12 are provided on the front surface TA and the rear surface TB of the plate 11 and hold the flat cable FCa of the front side of the bent line S and the flat cable FCb of the rear side of the bent line S along the front surface TA and the rear surface TB of the plate 11.

The restricting portions 13 are provided along the outer edges of the sleeve portions 11A and 11B of the plate 11 and located at the outer edges of the flat cables FCa and FCb of the front and rear sides of the bent line S which extends at a predetermined narrow angle to restrict the outward bound of the flat cables FCa and FCb of the front and rear sides, which are held by the holding pieces 12.

In the present embodiment, both the holding pieces 12 of the front surface TA and the rear surface TB of the plate 11 are provided as a pinch plate for pinching the flat cable FC (FCa and FCb) between the holding pieces 12 and the plate 11, are cantilever-supported by a support portion 13a which combines with the restricting portion 13 at a gap Su into which the flat cable FC (FCa and FCb) can be inserted between the plate 11 and the holding pieces 12, and are substantially disposed parallel to the front surface TA and the rear surface TB of the plate 11. In this case, a die-cut hole 15 for molding the holding piece 12 is provided in the plate 11 below the holding piece 12 and the gap Su is secured by the die-cut hole 15.

The holding piece 12 is cantilever-supported by the support part 13a which combines with the restricting portion 13 to form an insertion slot 16 for inserting the flat cable FC (FCa and FCb) between the holding piece 12 and the plate 11 on the side of a free end 12a of the holding piece 12. At least a portion of the insertion slot 16 is secured by the die-cut hole 15.

Removal preventive projections 17 and 18 for preventing the flat cable FC (FCa and FCb) inserted between the plate 11 and the holding pieces 12 through the insertion slot 16 are provided on the lower surface of the free end 12a of the holding piece 12 for forming the insertion slot 16 and the plate plane of the plate 11 located on the extension of the insertion slot 16. The top surfaces of the removal preventive projections 17 and 18 are sloped in a direction which allows the flat cable FC (FCa and FCb) to be easily inserted and prevents the flat cable FC (FCa and FCb) from being removed therefrom.

A positioning projection 19 which is engaged with a hole (not shown) of the flat cable FC (FCa and FCb) to position the flat cable FC (FCa and FCb) in the longitudinal direction is provided on the plate plane of the sleeve portions 11A and 11B of the plate 11 on which the flat cable FC is mounted. In this case, the positioning projection 19 is thrust into the insulator (more particularly, the bridge portion) of the flat cable FC (FCa and FCb) and the hole of the flat cable FC (FCa and FCb) is formed by thrusting the positioning projection 19 into the flat cable FC (FCa and FCb) at the same time of the engagement.

A groove 12m into which a convex portion Cp (conductor-disposing portion is the convex portion) of the front surface of the flat cable FC (FCa and FCb) is inserted is provided in the lower surface of the holding piece 12 provided as the pinch plate.

Mounting surfaces TC which have a height equal to or larger than that of the holding piece 12 and stably come into contact with a flat mounted-surface is provided on the front surface TA and the rear surface TB of the plate 11, around a position R1 in which the flat cable FC (FCa and FCb) is mounted and a work space R2 for engaging the flat cable FC (FCa and FCb) with the holding piece 12. The mounting surfaces TC are formed by partially thickening the plate 11 or erecting the wall of the restricting portion 13. More particularly, as shown in FIG. 5, since a position R3 of the drawing is needed as a work space for smoothly inserting the flat cable FC (FCa and FCb) between the holding piece 12 and the plate 11, the mounting surface TC is notched.

Next, the sequence of the case of bending and holding the flat cable FC using the bending holder 10 configured above will be described.

First, as shown in FIG. 3 (the side of the front surface TA) and FIG. 4 (the side of the rear surface TB), for example, the flat cable FC is set in the rear surface TB of the bending holder 10 while positioning the bent line S to the bending reference side 14. That is, the flat cable FCb of the rear side of the bent line S is inserted between the holding piece 12 and the plate 11 through the insertion slot 16. Accordingly, the flat cable FCb is interposed between the holding piece 12 and the plate 11. At this time, the flat cable FCb is pressed toward the positioning projection 19 such that the positioning projection 19 is thrust into the insulator of the flat cable FCb and thus the flat cable FCb is positioned in the longitudinal direction.

Next, the flat cable FC is bent to the front surface TA of the holder 10 in the bent line S using the bending reference side 14 as a bending die and the flat cable FCa of the front side of the bent line S is inserted between the holding piece 12 and the plate 11 through the insertion slot 16 of the front surface TA. Even in this case, the flat cable FCa is pressed toward the positioning projection 19 such that the positioning projection 19 is thrust into the insulator of the flat cable FCa and thus the flat cable FCa is positioned in the longitudinal direction.

Both the flat cables FCa and FCb bent above are engaged with the holding pieces 12 of the front surface TA and the rear surface TB such that the shape after bending can be securely held only using the holder 10. In the case of bending the flat cable FC having strong spring-back, an outward bounding force is generated in the bent flat cables FCa and FCb, but the outward bounding force of the flat cables FCa and FCb are securely restricted by the action of the restricting portion 13 formed by erecting the outer edge of the plate 11. Accordingly, the flat cables FCa and FCb can be held by the holding pieces 12 at proper positions. Thus, shape holding performance in the bent state is improved and the holder 10 is easily mounted in the vehicle body after bending.

Since the bending holder 10 can easily hold the flat cable only by inserting the flat cables FCa and FCb between the holding pieces 12 provided as the pinch plate and the plate 11, workability at the time of bending is excellent. When the flat cables FCa and FCb are inserted through the insertion slots 16, the flat cables FCa and FCb are prevented from being removed by the actions of the removal preventive projections 17 and 18.

Since the positioning projection 19 is mounted on the plate 11 to easily position the flat cable FC in the longitudinal direction, it is possible to properly determine the bent position only using the holder 10. In this case, the hole of the flat cable FC may be initially formed in the insulator of the flat cable FC or may be formed by thrusting the positioning projection 19 of the plate 11 into the insulator of the flat cable FC at the same time of the engagement, as described above.

Since the groove 12m into which the convex portion Cp of the front surface of the flat cable FC is formed in the lower surface of the holding piece 12 provided as the pinch plate, even the flat cable FC having the convex conductor-disposing portion can be closely adhered to the flat cable FC as shown and, as a result, the flat cable FC can be stably held without play.

Since the mounting surface TC having the height equal to or larger than that of the holding piece 12 is mounted in the plate 11, the mounting surface TA comes into contact with the flat mounted-surface of the vehicle body and, as a result, the holder 10 can be stably mounted without play.

Since the bending holder 10 according to the present embodiment has the L shape when viewing the plate 11 having the left and right sleeve portions 11A and 11B in a plan view and the bending reference side 14 cut obliquely is provided at the outer circumferential corner, a compact holder can be economically obtained.

Second Embodiment

Figure 7:
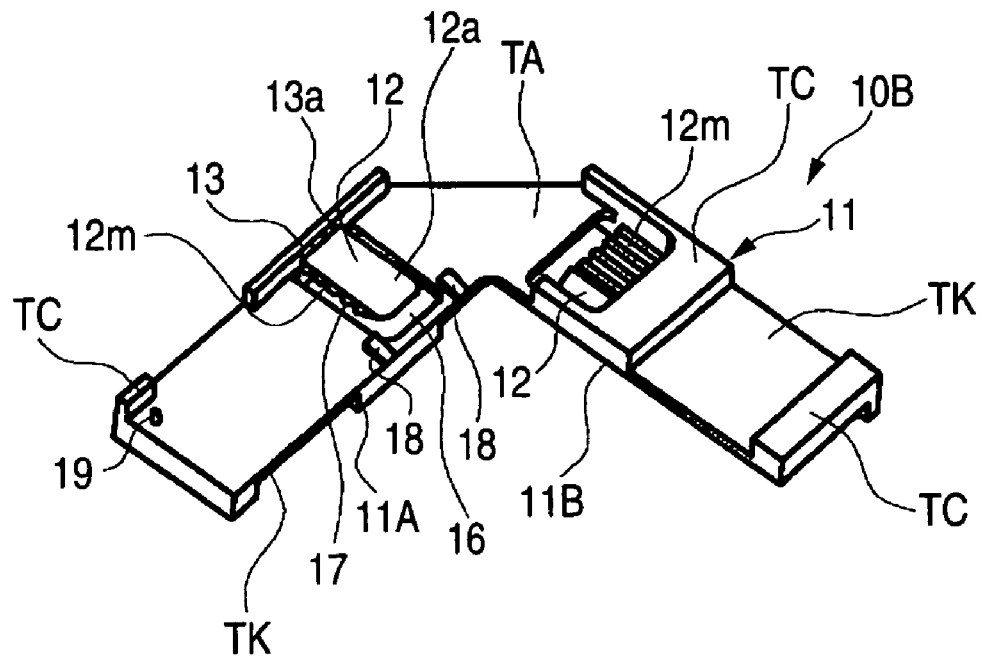
FIG. 7 is a perspective view showing the configuration of a flat cable bending holder according to a second embodiment of the present invention.
Figure 8:
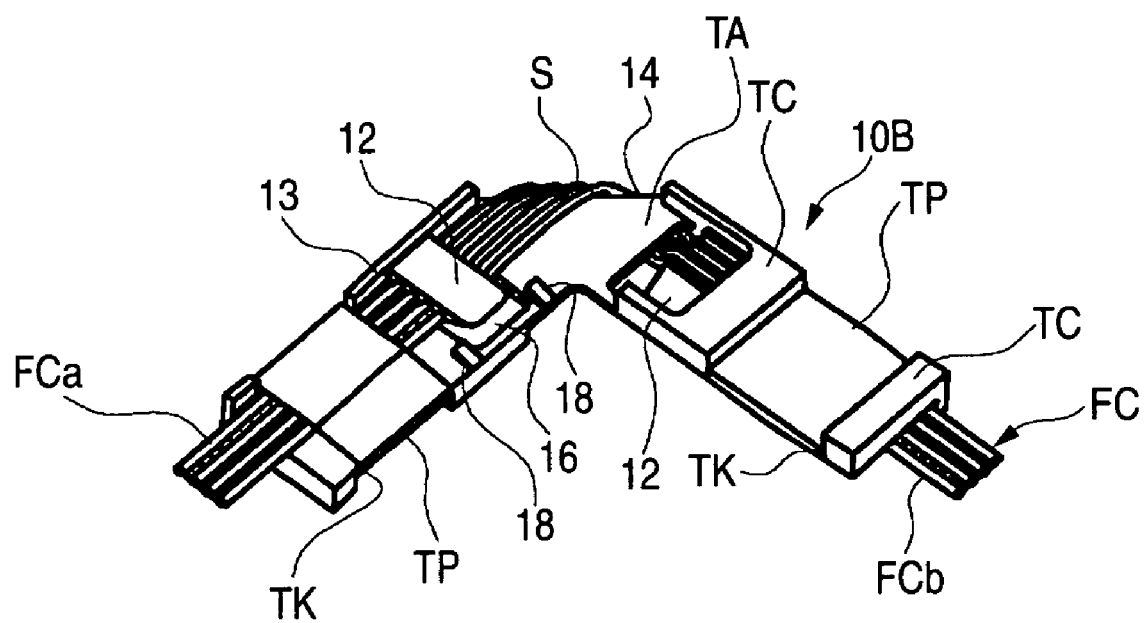
FIG. 8 is a perspective view showing a state that the flat cable is set in the bending holder.

FIG. 7 is a perspective view showing the configuration of a flat cable bending holder according to a second embodiment and FIG. 8 is a perspective view showing a state that the flat cable is set in the bending holder.

The bending holder 10B according to the second embodiment is different from the bending holder 10 according to the first embodiment in that the lengths of the left and right sleeve portions 11A and 11B increase and tape-winding concave portions TK for winding tapes on the flat cables FCa and FCb together with the sleeve portions 11A and 11B are provided at the ends of the holding pieces 12 of the sleeve portions 11A and 11B, respectively. Since the other configurations are the same as the first embodiment, the same components are denoted by the same reference numerals and thus their description will be omitted.

In the case where the tape-winding concave portions TK are provided, it is possible to securely wind the tapes TP at proper positions when winding the tapes TP to fix the flat cables FCa and FCb.

Third Embodiment

Figure 9:
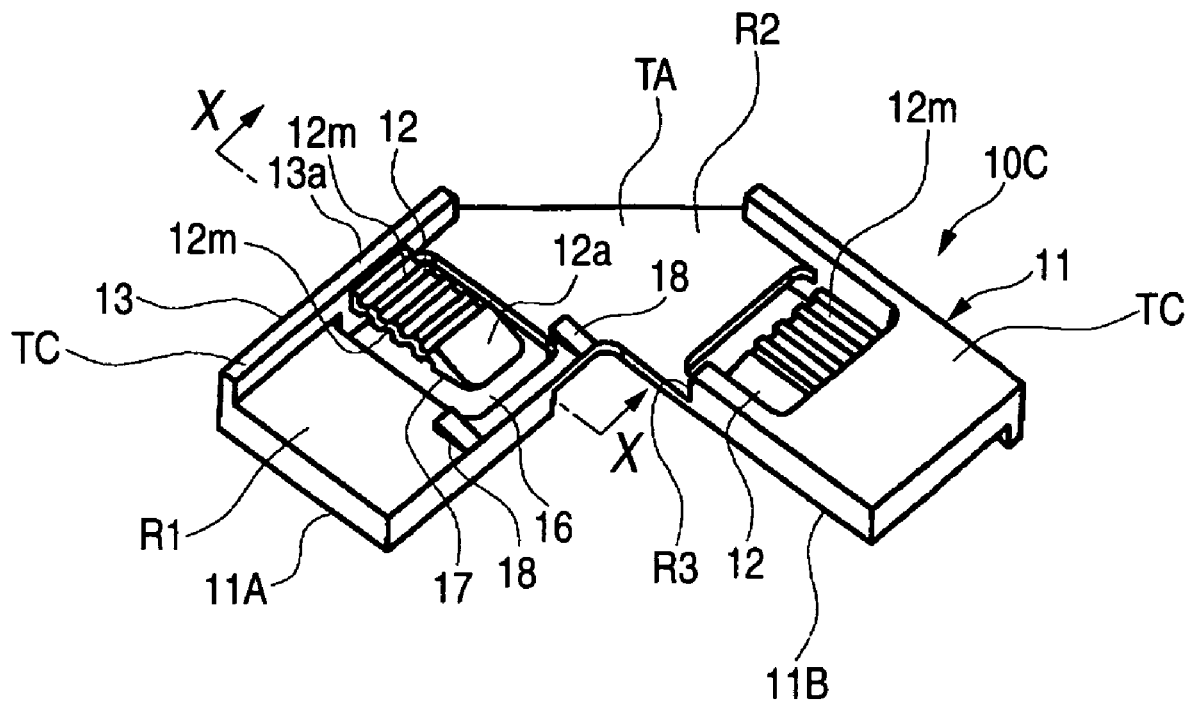
FIG. 9 is a perspective view showing a flat cable bending holder according to a third embodiment of the present invention, viewed from the front surface thereof.
Figure 10:
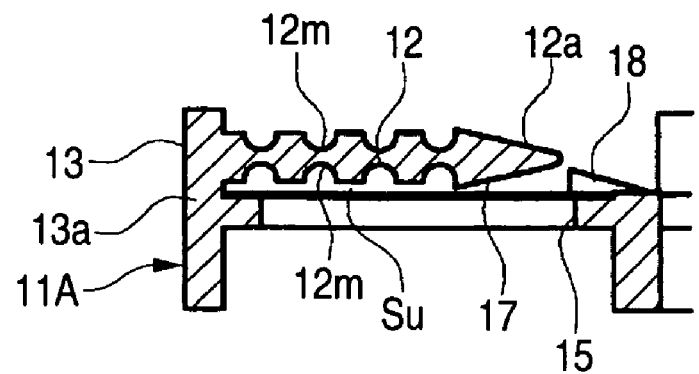
FIG. 10 is a cross-sectional view taken along line X-X of FIG. 9.
Figure 11:
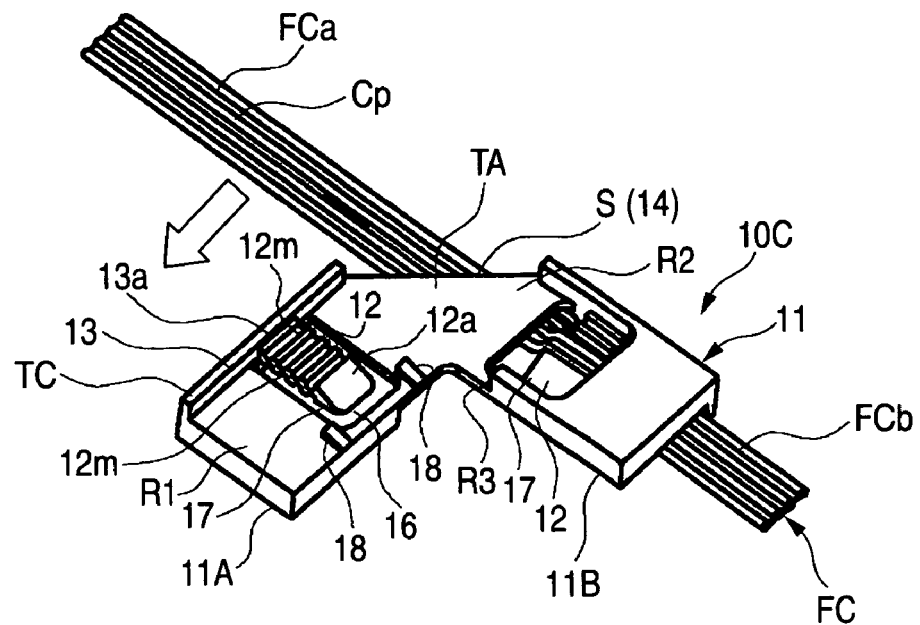
FIG. 11 is a perspective view showing a state that a flat cable is provided on the rear surface of the bending holder, viewed from the front surface thereof.
Figure 12:
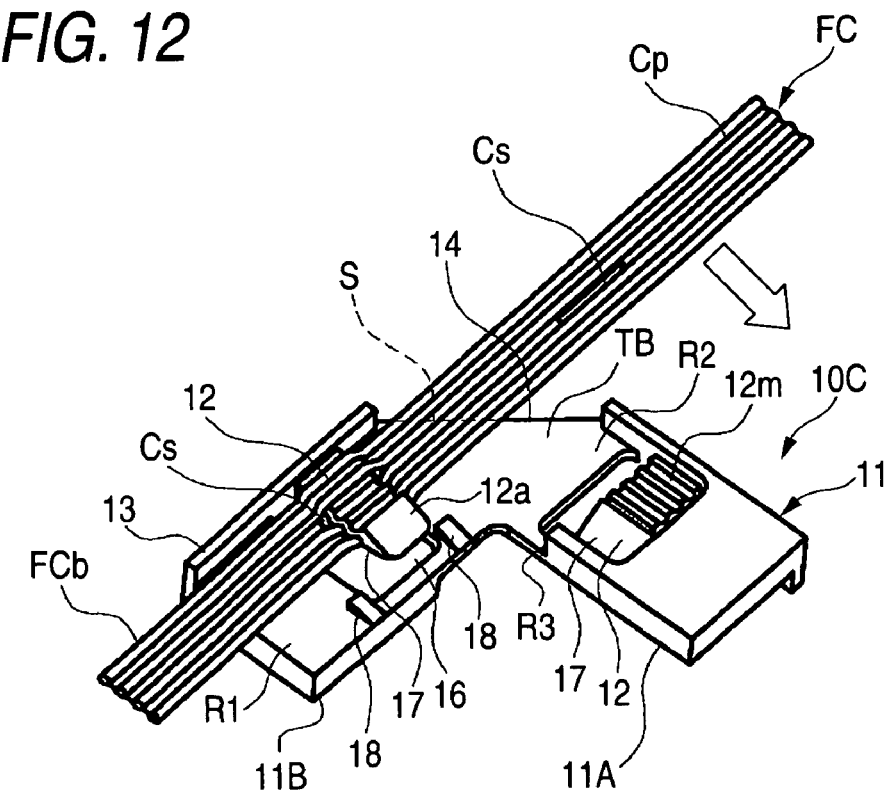
FIG. 12 is a perspective view the state of FIG. 11 viewed from the rear surface thereof.
Figure 13:
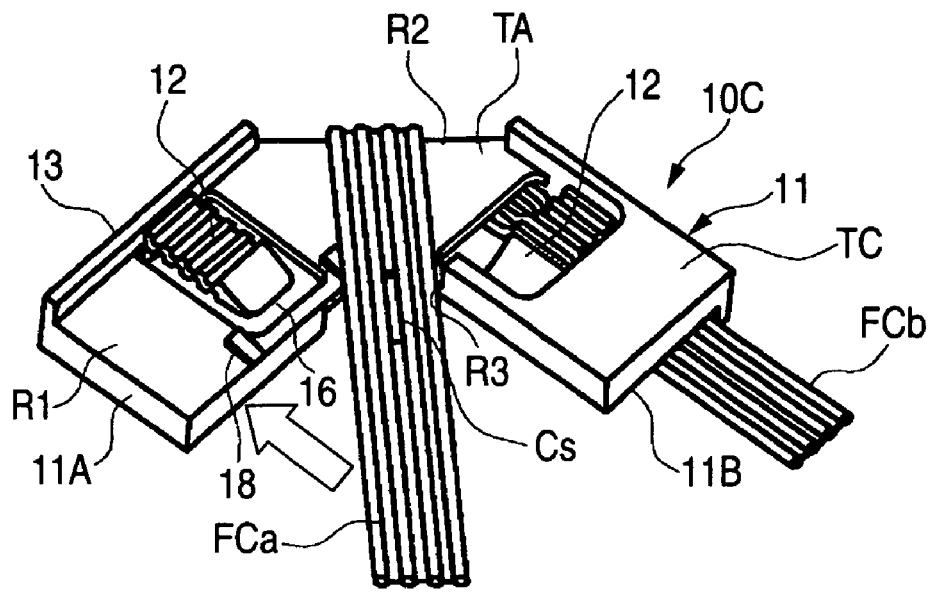
FIG. 13 is a perspective view showing a state that the flat cable is being bent on the front surface of the bending holder as a next operation of FIG. 11, viewed from the front surface thereof.
Figure 14:
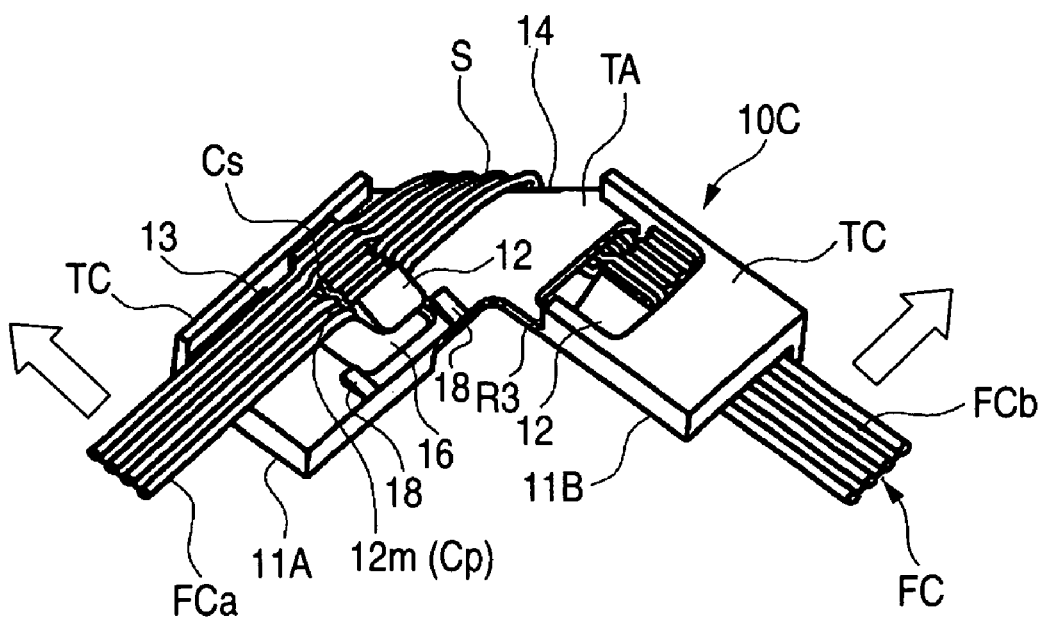
FIG. 14 is a perspective view showing a state that bending is finished on the bending holder, viewed from the front surface thereof.

FIGS. 9 to 14 show a flat cable bending holder according to a third embodiment, wherein FIG. 9 is a perspective view showing the flat cable bending holder viewed from the front surface thereof, FIG. 10 is a cross-sectional view taken along line X-X of FIG. 9, FIG. 11 is a perspective view showing a state that a flat cable is provided on the rear surface of the bending holder, viewed from the front surface thereof, FIG. 12 is a perspective view the state of FIG. 11 viewed from the rear surface thereof, FIG. 13 is a perspective view showing a state that the flat cable is being bent on the front surface of the bending holder as a next operation of FIG. 11, viewed from the front surface thereof, and FIG. 14 is a perspective view showing a state that bending is finished on the bending holder, viewed from the front surface thereof.

A bending holder 10C according to the third embodiment is different from the bending holder 10 according to the first embodiment in that the holding pieces 12 of the front surface TA and the rear surface TB of the plate 11 are provided as penetration plates which penetrate through slit-shaped penetrated holes Cs formed in the flat cable FC and position and hold the flat cable FC in the longitudinal direction, the grooves 12m into which the concave portion Cp of the front surface of the flat cable FC are inserted are formed in the upper surfaces and the lower surfaces of the holding pieces 12 provided as the penetration plates, and the free ends 12a of the holding pieces 12 provided as the penetration plates are formed in a comb-shaped cross-sectional shape. Since the other configurations are the same as the first embodiment, the same components are denoted by the same reference numerals and thus their description will be omitted.

In the case where the flat cable FC is bent and held using the bending holder 10C, a work is performed in the following sequence.

First, as shown in FIG. 11 (the side of the front surface TA) and FIG. 12 (the side of the rear surface TB), for example, the flat cable FC is set in the rear surface TB of the bending holder 10C while positioning the bent line S to the bending reference side 14. That is, the free end 12a of the holding piece 12 formed as the penetration plate penetrates through the penetrated hole Cs of the flat cable FCb of the back side of the bent line S to dispose approximately a half of the width direction of the flat cable FCb above the holding piece 12 and to dispose the rest of the width direction of the flat cable FCb below the holding piece 12. The portion of the flat cable positioned below the holding piece 12 is, for example, disposed on the side of the free end 12a, inserted between the holding piece 12 and the plate 11 through the insertion slot 16, and held by the holding piece 12. The portion of the flat cable positioned above the holding piece 12 is pressed to the base of the holding piece 12 and held in a state that the flat cable FCb is flat as much as possible.

The flat cable FCb can be easily held on the plate 11 while positioning the flat cable FCb in the longitudinal direction by penetrating the holding piece 12 through the penetrated hole Cs of the flat cable FCb. Accordingly, the positioning projection 19 of the first embodiment is unnecessary.

Next, the flat cable FC is bent to the front surface TA of the holder 10C in the bent line S using the bending reference side 14 as a bending die and the flat cable FCa of the front side of the bent line S is set to the front surface TA of the holder 10C similar to that of the rear surface TB. That is, the free end 12a of the holding piece 12 formed as the penetration plate penetrates through the penetrated hole Cs of the flat cable FCa of the front side of the bent line S to dispose approximately a half of the width direction of the flat cable FCa above the holding piece 12 and to dispose the rest of the width direction of the flat cable FCa below the holding piece 12. The portion of the flat cable positioned below the holding piece 12 is, for example, disposed on the side of the free end 12a, inserted between the holding piece 12 and the plate 11 through the insertion slot 16, and held by the holding piece 12. The portion of the flat cable positioned above the holding piece 12 is pressed to the base of the holding piece 12 and held in a state that the flat cable FCa is flat as much as possible.

Even on the front surface TA of the holder 10C, the flat cable FCa can be easily held on the plate 11 while positioning the flat cable FCa in the longitudinal direction by penetrating the holding piece 12 through the penetrated hole Cs of the flat cable FCa.

Accordingly, both the bent flat cables FCa and FCb are engaged with the holding pieces 12 of the front surface TA and the rear surface TB such that the shape after bending can be securely held only using the holder 10C. In the case of the flat cable FC having strong spring-back, an outward bounding force is generated in the bent flat cable FCa and FCb, but the outward bounding force of the flat cables FCa and FCb are securely restricted by the action of the restricting portion 13 formed by erecting the outer edge of the plate 11. Accordingly, the flat cables FCa and FCb can be held by the holding pieces 12 at proper positions. Thus, shape holding performance in the bent state is improved and the holder 10C is easily mounted in the vehicle body after bending.

Since the bending holder 10C can easily hold the flat cable FC only by penetrating the holding pieces provided as the penetration plates through the penetrated holes Cs of the flat cables FCa and FCb through the inside having the narrow angle, workability at the time of bending is excellent. When the halves of the width direction of the flat cables FCa and FCb inserted through the insertion slots 16 are prevented from being removed by the actions of the removal preventive projections 17 and 18, the flat cables FCa and FCb are prevented from being removed.

Since the free ends 12a of the holding pieces 12 provided as the penetration plates are formed in the comb-shaped cross-sectional shape, the holding pieces 12 are easy to penetrate through the penetrated holes Cs of the flat cables FCa and FCb and are hard to be removed therefrom after penetrating through the penetrated holes Cs.

Since the grooves 12m into which the convex portion Cp of the front surface of the flat cable FC are formed in the lower surface and the upper surface of the holding piece 12 provided as the penetration plate, even the flat cable FC having the convex conductor-disposing portion can be closely adhered to the flat cable FC as shown and, as a result, the flat cable FC can be stably held without play.

Since the mounting surface TC having the height equal to or larger than that of the holding piece 12 is mounted in the plate 11, the mounting surface TA comes into contact with the flat mounted-surface of the vehicle body and, as a result, the holder 10 can be stably mounted without play.

Since the bending holder 10C according to the present embodiment has the L shape when viewing the plate 11 having the left and right sleeve portions 11A and 11B in a plan view and the bending reference side 14 cut obliquely is provided at the outer circumferential corner, a compact holder can be economically obtained.

Fourth Embodiment

Figure 15:
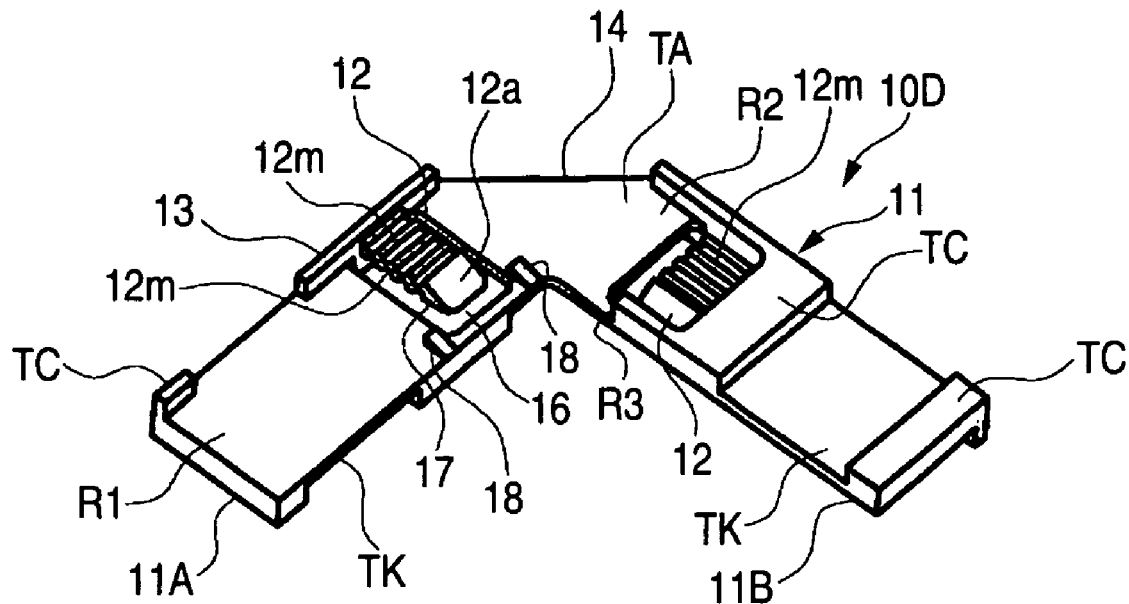
FIG. 15 is a perspective view showing the configuration of a flat cable bending holder according to a fourth embodiment of the present invention.
Figure 16:
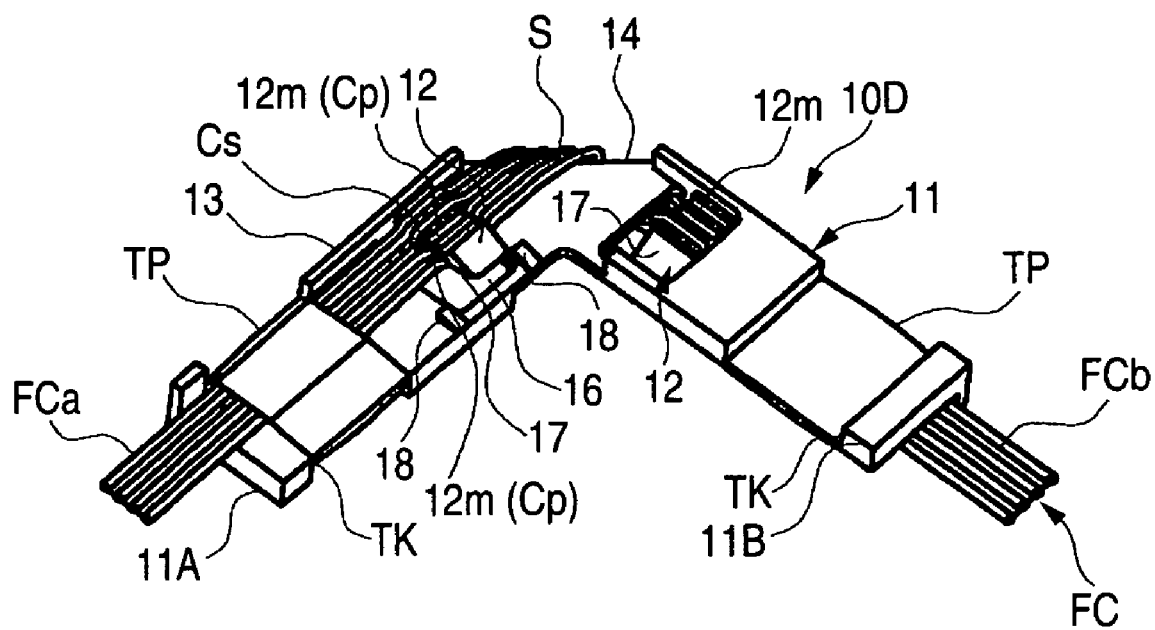
FIG. 16 is a perspective view showing a state that a flat cable is set in the bending holder.

FIG. 15 is a perspective view showing the configuration of a flat cable bending holder according to a fourth embodiment and FIG. 16 is a perspective view showing a state that a flat cable is set in the bending holder.

The bending holder 10D according to the fourth embodiment is different from the bending holder 10C according to the third embodiment in that the lengths of the left and right sleeve portions 11A and 11B increase and tape-winding concave portions TK for winding tapes on the flat cables FCa and FCb together with the sleeve portions 11A and 11B are provided in the ends of the holding pieces 12 of the sleeve portions 11A and 11B, respectively. Since the other configurations are the same as the third embodiment, the same components are denoted by the same reference numerals and thus their description will be omitted.

In the case where the tape-winding concave portions TK are provided, it is possible to securely wind the tapes TP at proper positions when winding the tapes TP to fix the flat cables FCa and FCb.

Although the same type of holding pieces 12 are provided on the left and right sleeve portions 11A and 11B in the above-described embodiments (the holding pieces of the first and second embodiment are of the pinch type and the holding pieces of the third and fourth embodiments are of the penetration type), the both types may be combined. The tape-winding concave portions TK may be provided in any one of the sleeve portions 11A and 11B.

The present invention is not limited to the above-described embodiments and various alterations, modifications or combinations of the embodiments may be made. The materials, the shapes, the dimensions, the numerals, the aspects, the number, the disposed positions of the components of the above-described embodiments are exemplary and are not limited thereto.

Fifth Embodiment

Figure 17:
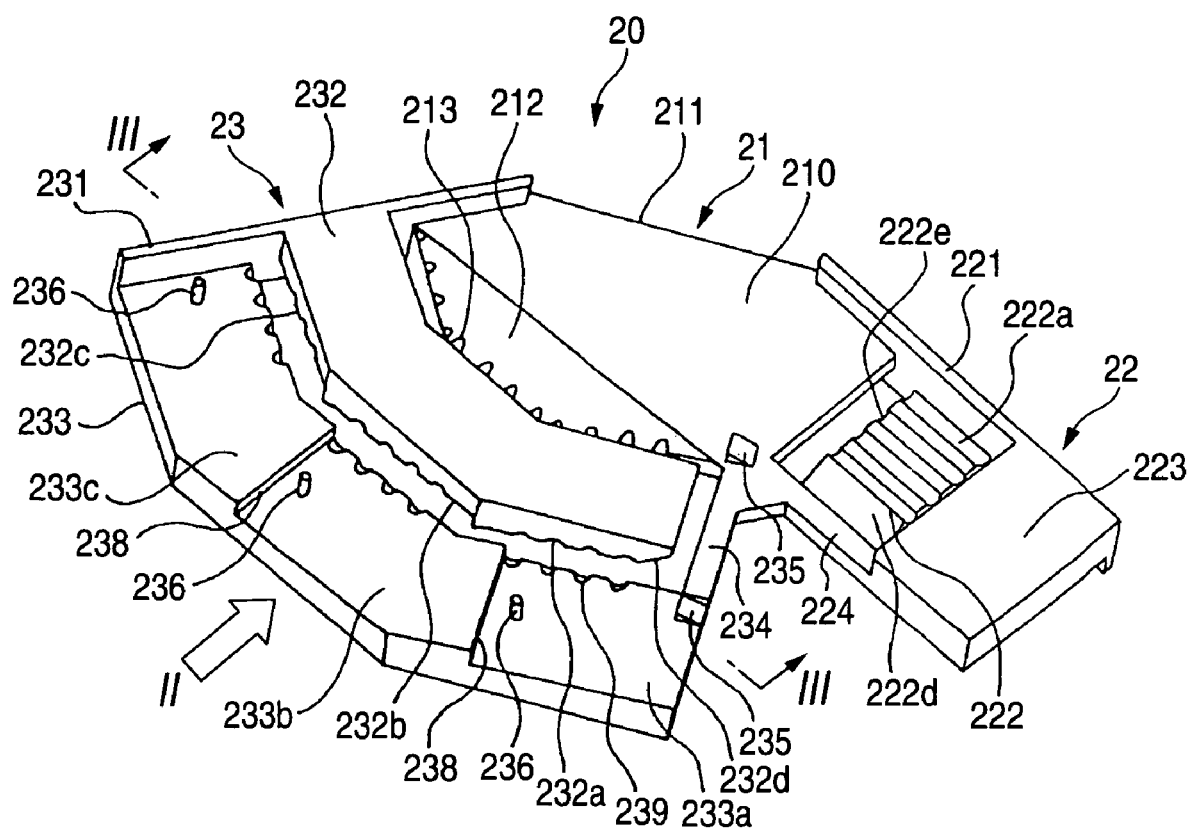
FIG. 17 is a perspective view showing a flat cable bending holder according to an embodiment of the present invention, viewed from the front surface thereof.
Figure 18:
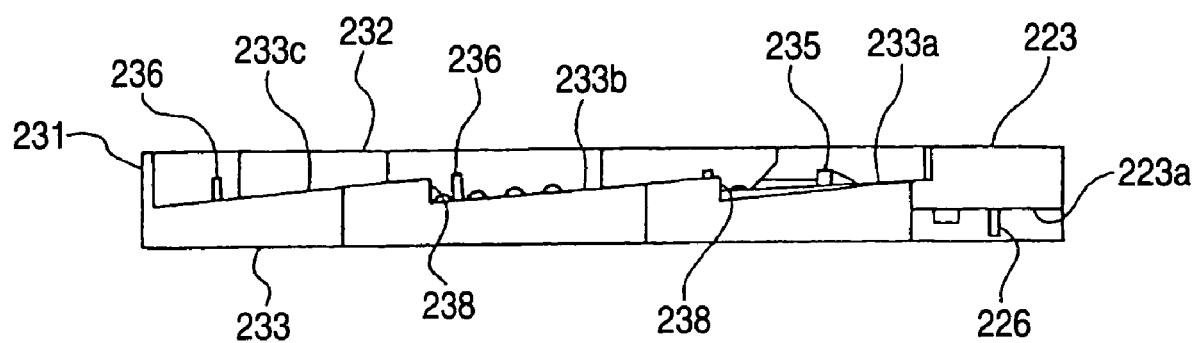
FIG. 18 is a side view showing the flat cable bending holder viewed in a direction denoted by an arrow II of FIG. 17.
Figure 19:
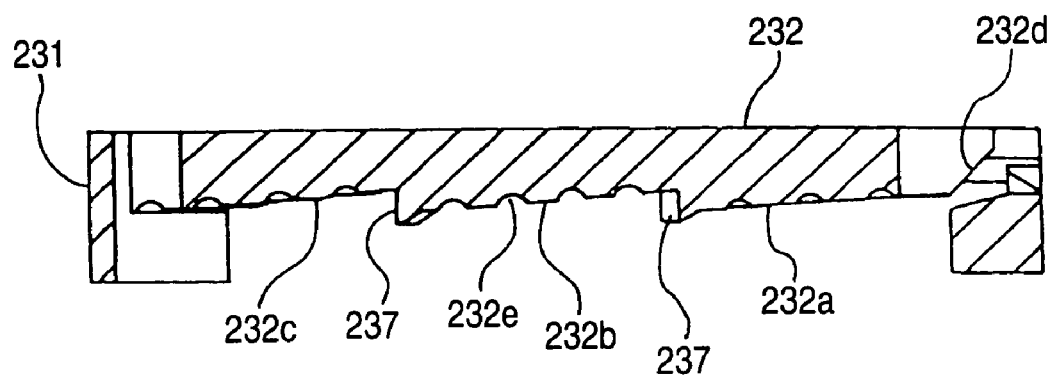
FIG. 19 is a cross-sectional view taken along line III-III of FIG. 17.

FIGS. 17 to 19 show the configuration of a flat cable bending holder and FIGS. 20 to 25 show a procedure for bending the flat cable (referred to as the "flat cable", although the FFC is used in the present embodiment as described above) using the holder. FIG. 17 is a perspective view showing the bending holder viewed from the front surface thereof, FIG. 18 is a side view showing the bending holder viewed in a direction denoted by an arrow II of FIG. 17, and FIG. 19 is a cross-sectional view showing the bending holder taken along line III-III of FIG. 17.

As shown in FIG. 17, the flat cable bending holder 20 roughly includes a base portion 21 on which the flat cable is bent, an entrance-side holding portion 22 for holding the flat cable which is introduced into the base portion 21, and an exit-side holding portion 23 for holding the flat cable bent on the base portion 21 at a bending angle of 60 degrees, 90 degrees or 120 degrees. The base portion 21, the entrance-side holding portion 22 and the exit-side holding portion 23 are integrally formed of plastic.

The exit-side holding portion 22 includes a sidewall 221 for restricting outward expanding of the flat cable, a locking piece 222 of which one side is supported by the sidewall 221, a support plate 223 which holds the flat cable in cooperation with the locking piece 222 and the base portion 21, and a connection portion 224 which connects one side of the support plate 223 to the base portion 21.

Figure 20:
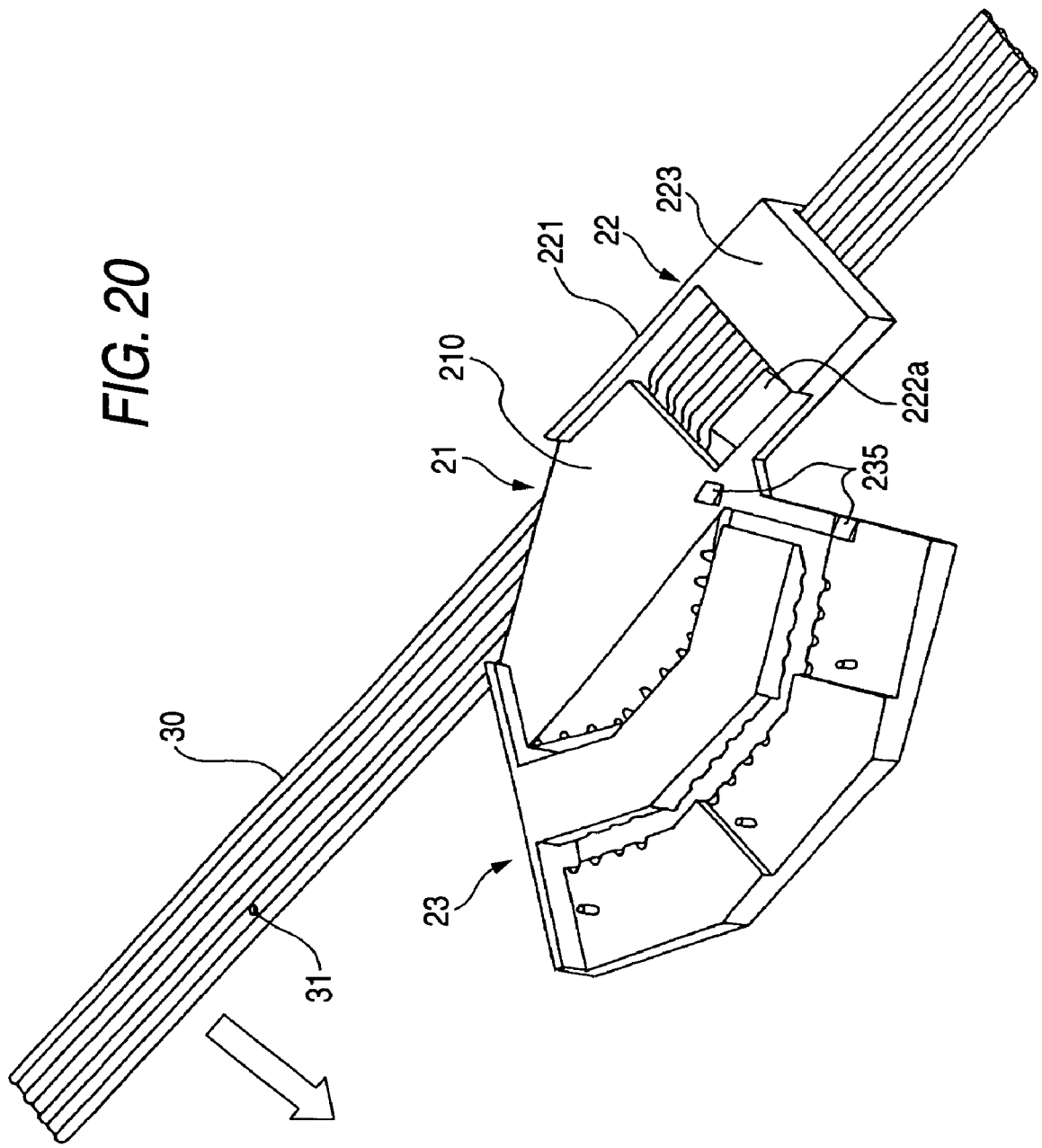
FIG. 20 is a perspective view showing a state that the flat cable is held in an entrance-side holding portion of the bending holder, viewed from the front surface thereof.
Figure 21:
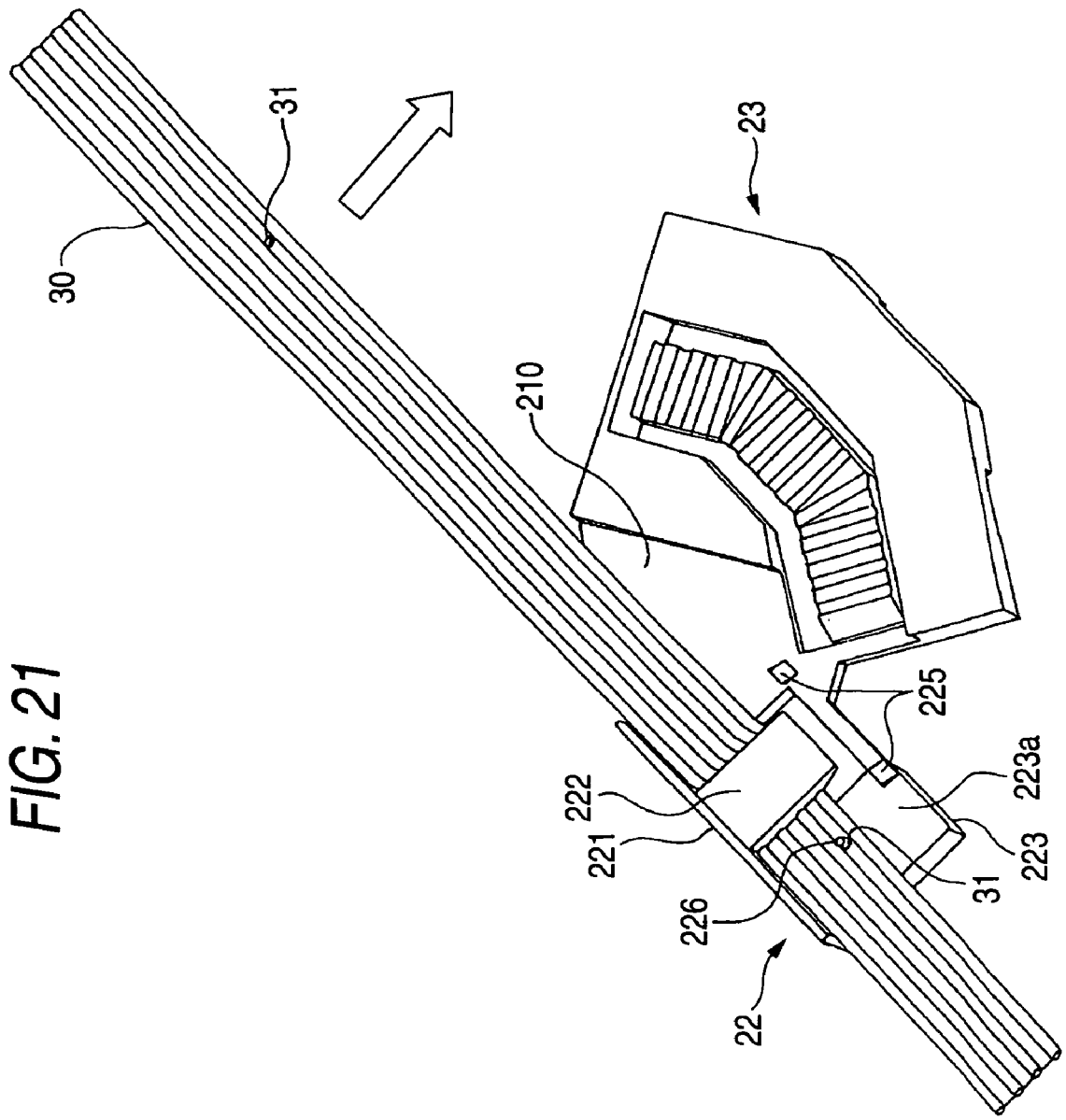
FIG. 21 is a perspective view showing the state of FIG. 20, viewed from the rear surface thereof.

The support plate 223 has a support surface 223a (FIGS. 18 and 21) which is in contact with the flat cable at the rear surface (lower surface) and a positioning projection 226 which is inserted into a penetrated hole 31 (FIGS. 20 and 21) of the flat cable to position the flat cable is provided on the support surface 223a (FIGS. 18 and 21).

The support plate 223 is fixed to the sidewall 221 and the connection portion 224 and connected to a base body 210 of the base portion 21. The locking piece 222 has a locking surface 222a, which is in contact with the flat cable, at the front surface (upper surface) and grooves 222e into which projection strips (projection strips are generated at positions in which conductors are provided) of the flat cable are inserted are formed in the locking surface 222a.

The support plate 223, the locking piece 222 and the base body 210 are arranged at gaps between which the flat cable passes when viewed from the front surface thereof. When viewed from the lateral side, the locking piece 222 is fixed to the lower edge of the sidewall 221, the support plate 223 is fixed to the upper edge of the sidewall 221, and the support surface 223a of the support plate 223, the locking surface 222a of the locking piece 222 and the rear surface of the base body 210 are positioned on the substantially same plane. A slope surface 222d is provided on a free end of the locking piece 222 of which one side is supported by the sidewall 221 so as to facilitate the insertion of the flat cable and the flat cable is inserted from the lateral side of the free end of the locking piece 222 and weaves among the support plate 223, the locking piece 222 and the base body 210.

A projection portion 225 (FIG. 21) for preventing the flat cable from exiting is provided on the support plate 223 and the base body 210 adjacent to the free end of the locking piece 222. A slope surface for gradually increasing the height of the projection portion 225 toward the locking piece 222 is formed in the projection portion 225. Accordingly, the flat cable is inserted from the free end of the locking piece 222 without an obstacle, but, when the flat cable exits from the free end of the locking piece 222, the flat cable collides against the vertical surface of the projection portion 225 to be prevented from exiting.

The base portion 21 has the plate-shaped base body 210, and the base body 210 is connected to the entrance-side holding portion 22 through the sidewall 221 and the connection portion 224 and connected to the exit-side holding portion 23 through a sidewall 231 and a connection portion 234. The base body 210 has an oblique side 211 for bending the flat cable from the rear surface (lower surface) to the front surface (upper surface) thereof. The outer edges except the oblique side 211 are surrounded by the sidewall 221 or the sidewall 231 and prevent the flat cable from being bent at the positions except the oblique side 211.

The base body 210 has an oblique surface 212 for guiding the bent flat cable to the exit-side holding portion 23 and passing grooves 213 through which the projection strips of the flat cable pass are provided in the front end of the oblique surface 212.

The exit-side holding portion 23 includes the sidewall 231, a locking piece 232, a support plate 233 and the connection portion 234, similar to the entrance-side holding portion 22, but is different from the entrance-side holding portion 22 in that the exit-side holding portion 23 has the shape similar to that of the reversed entrance-side holding portion 22 so as to hold the flat cable which is bent on the base portion 21, and the locking piece 232 and the support plate 233 are configured to hold the flat cable at a bending angle of 60 degrees, 90 degrees or 120 degrees.

That is, as shown in FIG. 19, the locking piece 232 of which one side is supported by the sidewall 231 has a first locking surface 232a for holding the flat cable at the bending angle of 60 degrees, a second locking surface 232b for holding the flat cable at the bending angle of 90 degrees and a third locking surface 232c for holding the flat cable at the bending angle of 120 degrees, which are sequentially disposed from the free end at the rear surface (lower surface) thereof. Each of the first locking surface 232a, the second locking surface 232b and the third locking surface 232c tapers so as to gradually decrease the thickness of the locking piece 232 toward the free end of the locking piece 232, the thickness of the locking piece 232 increases at the boundary between the third locking surface 232c and the second locking surface 232b and the boundary between the second locking surface 232b and the first locking surface 232a, and step differences (locking projection portions) 237 for preventing the flat cable from moving from the third locking surface 232c to the second locking surface 232b or from the second locking surface 232b to the first locking surface 232a are formed. A slope surface 232d for facilitating the insertion of the flat cable is provided in the free end of the locking piece 232 and grooves 232e into which the projection strips of the flat cable are inserted are formed in each of the first locking surface 232a, the second locking surface 232b and the third locking surface 232c.

As shown in FIGS. 17 and 18, the support plate 233 fixed to the sidewall 231 and the connection portion 234 has a first support surface 233a for holding the flat cable at the bending angle of 60 degrees, a second support surface 233b for holding the flat cable at the bending angle of 90 degrees and a third support surface 233c for holding the flat cable at the bending angle of 120 degrees, at the front surface (upper surface) thereof. Each of the first support surface 233a, the second support surface 233b and the third support surface 233c tapers so as to gradually decrease the thickness of the support plate 233 toward the sidewall 231, the thickness of the support plate 233 increases at the boundary between the first support surface 233a and the second support surface 233b and the boundary between the second support surface 233b and the third support surface 233c, and step differences (wire contact portions) 238 which are in contact with the flat cable to position the flat cable on the first support surface 233a and the second support surface 233b are formed. The sidewall 231 functions as a wire contact portion which positions the flat cable on the third support surface 233c.

A positioning projection 236 which is inserted into the penetrated hole 31 (FIG. 20) of the flat cable to position the flat cable is provided in each of the first support surface 233a, the second support surface 233b and the third support surface 233c and passing grooves 239 through which the projection strips of the flat cable pass are provided in the front end of the locking piece 232.

The support plate 233, the locking piece 232 and the base body 210 are arranged at gaps through which the flat cable passes when viewed from the front surface thereof. When viewed from the lateral side, the locking piece 232 is fixed to the upper edge of the sidewall 231, the support plate 233 is fixed to the lower edge of the sidewall 231, and the heights of the first support surface 233a, the second support surface 233b and the third support surface 233c of the support plate 233 are substantially similar to those of the first locking surface 232a, the second locking surface 232b and the third locking surface 232c of the locking piece 232.

The flat cable bent on the base portion 21 is inserted from the free end of the locking piece 232 of which one side is supported and weaves among the base body 210, the locking piece 232 and the support plate 233. At this time, the flat cable is inserted to the position of the first locking surface 232a, the position of the second locking surface 232b or the third locking surface 232c of the locking piece 232 according to the bending angle and is supported by the first support surface 233a, the second support surface 233b or the third support surface 233c of the support plate 233.

Projection portions 235 for preventing the flat cable from exiting from the locking piece 232 is provided on the support plate 233 and the base body 210 adjacent to the free end of the locking piece 232. A slope surface for gradually increasing the height of the projection portion 235 toward the locking piece 232 is formed in the projection portion 235 which performs the same function as the projection portion 225 (FIG. 21).

Next, a procedure for bending the flat cable using the flat cable bending holder 20 will be described with reference to FIGS. 20 to 25.

First, as shown in FIG. 20 (viewed from the front surface thereof) and FIG. 21 (viewed from the rear surface thereof), the flat cable 30 in which the penetrated hole 31 is formed at a predetermined position of the bridge portion is inserted from the free end of the locking piece 222 of the entrance-side holding portion 22 to the sidewall 221 and the positioning projection 226 which is provided on the support surface 223a of the support plate 223 is inserted into the penetrated hole 31 of the flat cable 30 to position the flat cable 30 on the support surface 223a.

At this time, the flat cable 30 is inserted among the support plate 223, the locking piece 222 and the base body 210 so as to be brought into contact with the support surface 223a of the support plate 223, to be bent in the gap between the support plate 223 and the locking piece 222, and to be brought into contact with the locking surface 222a of the locking piece 222, to be bent in the gap between the locking piece 222 and the base body 210, and to be brought into contact with the rear surface of the base body 210.

Figure 22:
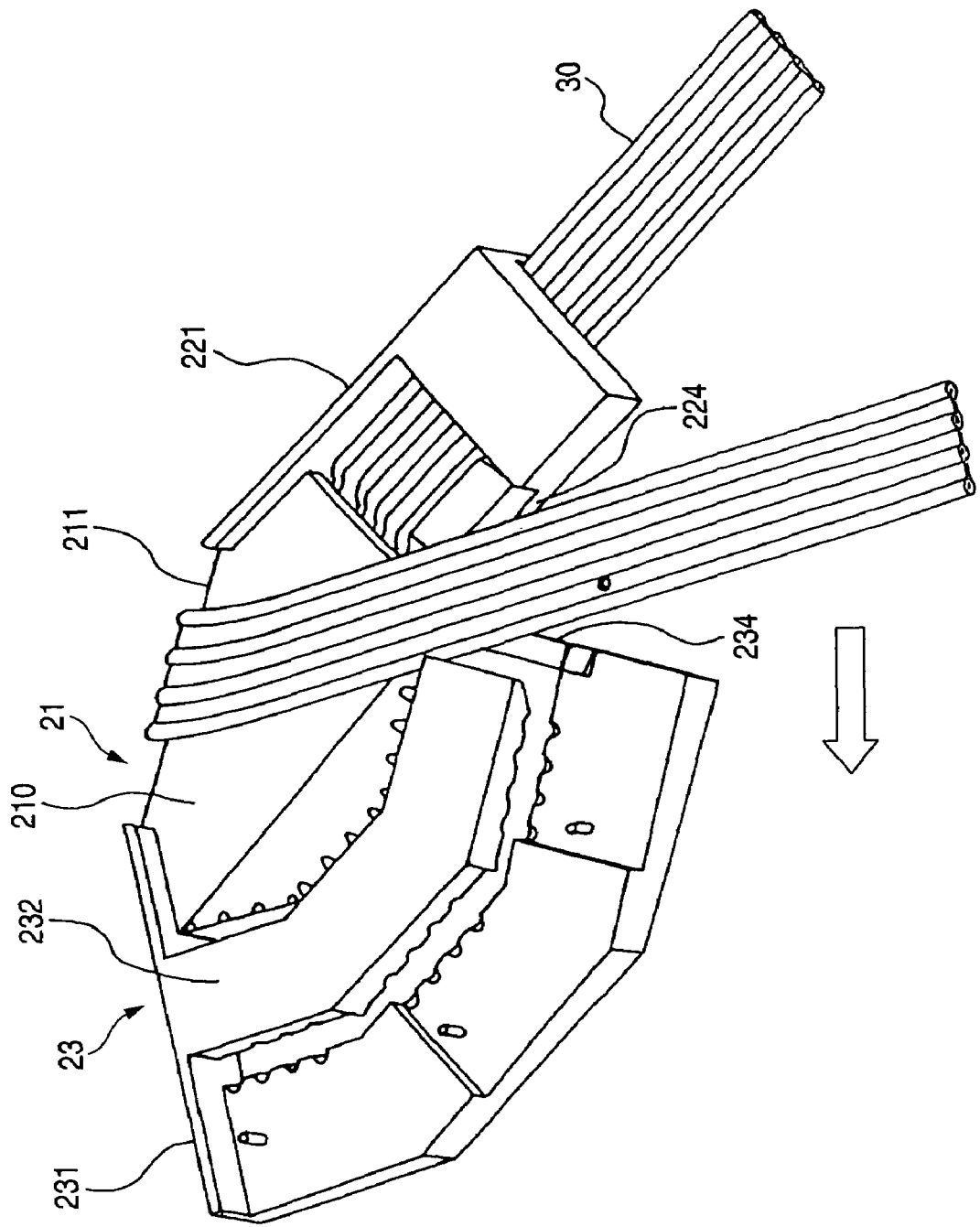
FIG. 22 is a perspective view showing a state that the flat cable is bent on the front surface of the bending holder as a next operation of FIG. 20, viewed from the front surface thereof.

Next, as shown in FIG. 22, the flat cable 30 is bent on the oblique side 211 of the base body 210 and guided to the free end of the locking piece of the exit-side holding portion 23 (white arrows of FIGS. 20 and 21 show the directions for bending the flat cable 30 to a state shown in FIG. 22). At this time, since the widths of the connection portions 224 and 234 are smaller than those of the sidewalls 221 and 231, works such as bending and so on are not obstructed.

Figure 23:
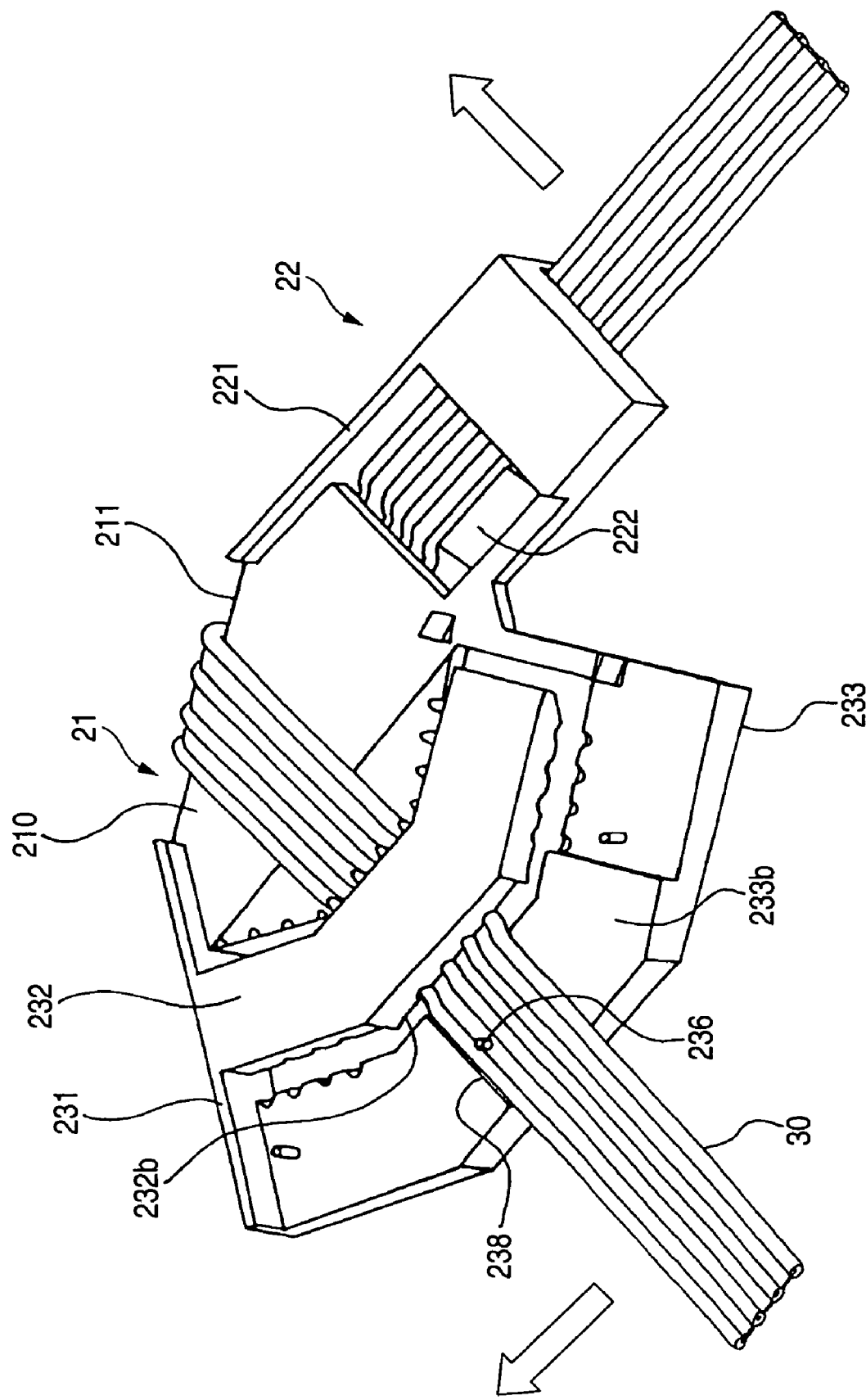
FIG. 23 is a perspective view showing a state that the flat cable is bent using the bending holder by 90 degrees, viewed from the front surface thereof.

Next, when the bending angle of the flat cable 30 is 90 degrees, as shown in FIG. 23, the flat cable 30 is inserted from the free end of the locking piece 232 to be brought into contact with the wire contact portion 238 between the second support surface 233b and the third support surface 233c of the support plate 233, and the positioning projection 236 of the second support surface 232b is inserted into the penetrated hole 31 of the flat cable 30 to position the flat cable 30 on the second support surface 233b (a white arrow of FIG. 22 shows the direction for moving the flat cable 30 to a state shown in FIG. 23).

At this time, the flat cable 30 is inserted among the base body 210, the locking piece 232 and the support plate 233 to be bent on the oblique side 211 of the base body 210 at 90 degrees, to be inserted into the gap between the base body 210 and the locking piece 232, to be brought into contact with the second locking surface 232b of the locking piece 232, to be inserted into the gap between the locking piece 232 and the support plate 233, and to be brought into contact with the second support surface 233b of the support plate 233.

Figure 24:
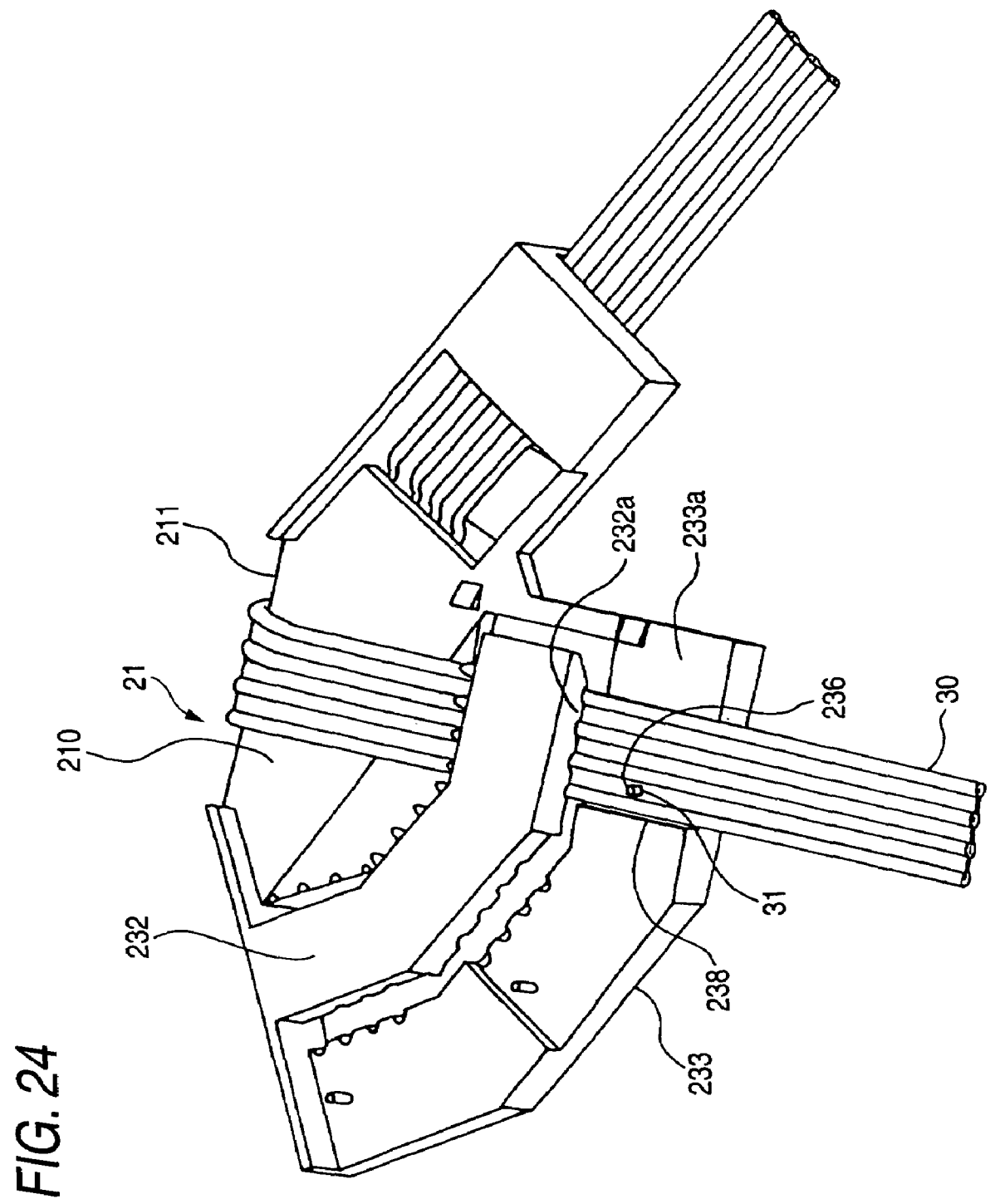
FIG. 24 is a perspective view showing a state that the flat cable is bent using the being holder by 60 degrees, viewed from the front surface thereof.

When the bending angle of the flat cable 30 is 60 degrees, as shown in FIG. 24, the flat cable 30 is inserted from the free end of the locking piece 232 to be brought into contact with the wire contact portion 238 between the first support surface 233a and the second support surface 233b of the support plate 233 and the positioning projection 236 of the first support surface 233a is inserted into the penetrated hole 31 of the flat cable 30 to position the flat cable 30 on the first support surface 233a.

At this time, the flat cable 30 is inserted among the base body 210, the locking piece 232 and the support plate 233 to be bent at the oblique side 211 of the base body 210 at 60 degrees, to be inserted into the gap between the base body 210 and the locking piece 232, to be brought into contact with the first locking surface 232a of the locking piece 232, to be inserted into the gap between the locking piece 232 and the support plate 233 and to be brought into contact with the first support surface 233a of the support plate 233.

Figure 25:
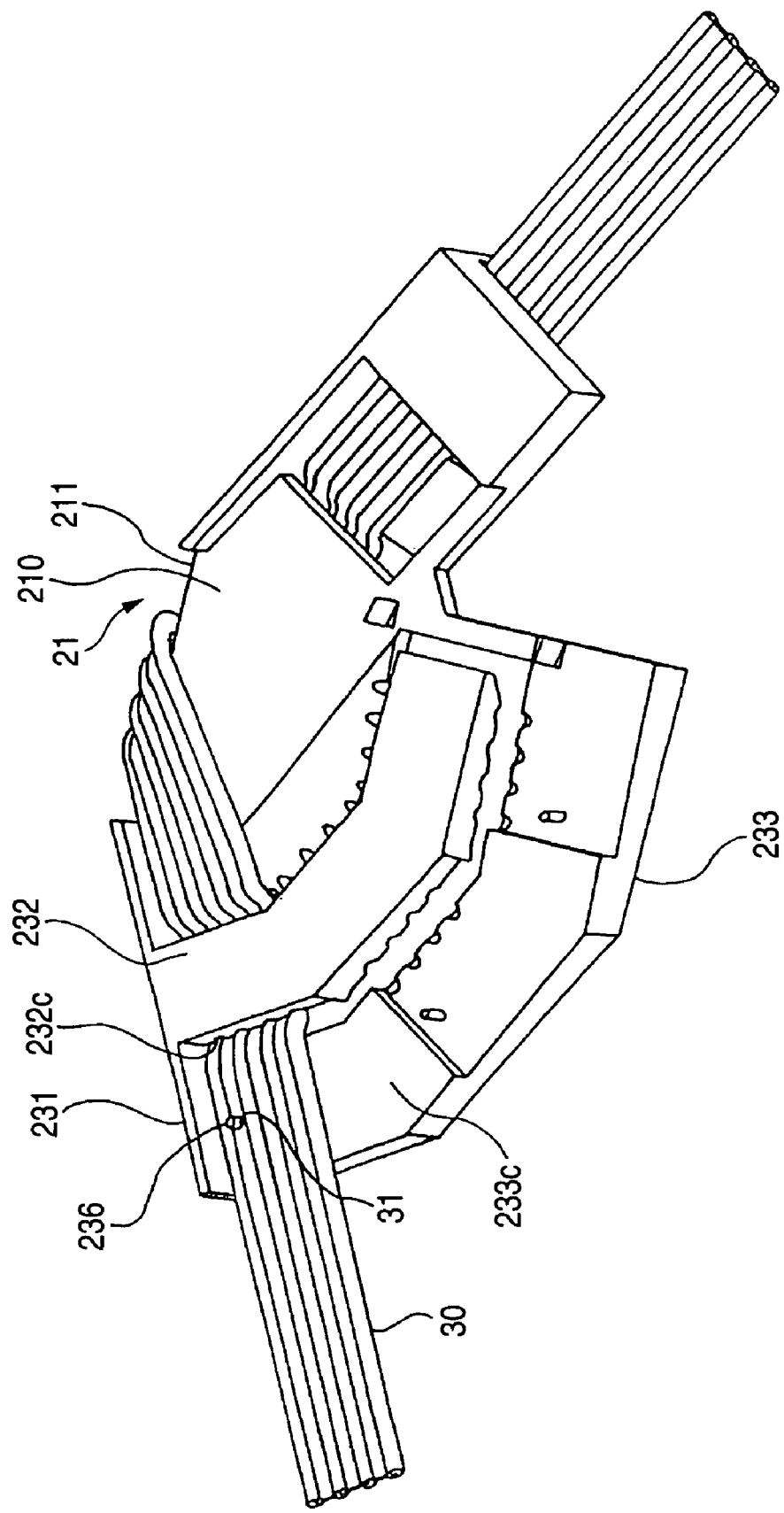
FIG. 25 is a perspective view showing a state that the flat cable is bent using the being holder by 120 degrees, viewed from the front surface thereof.
Figure 26:
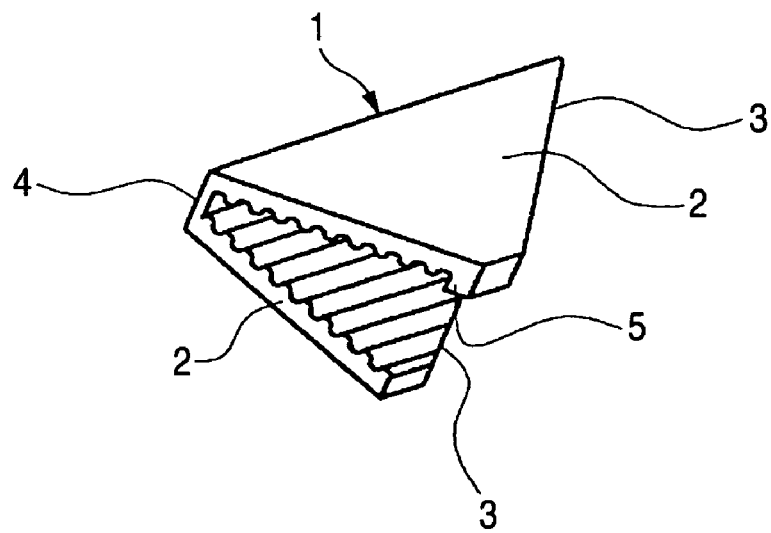
Figure 26:
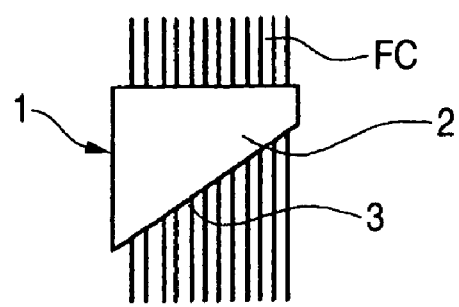
Figure 26:
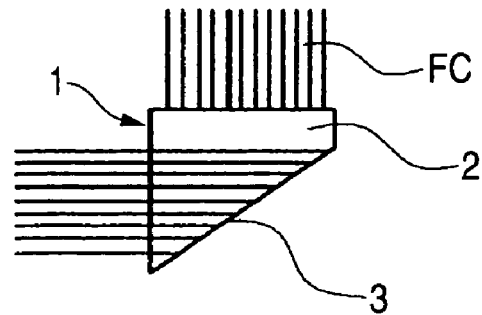
Figure 27:
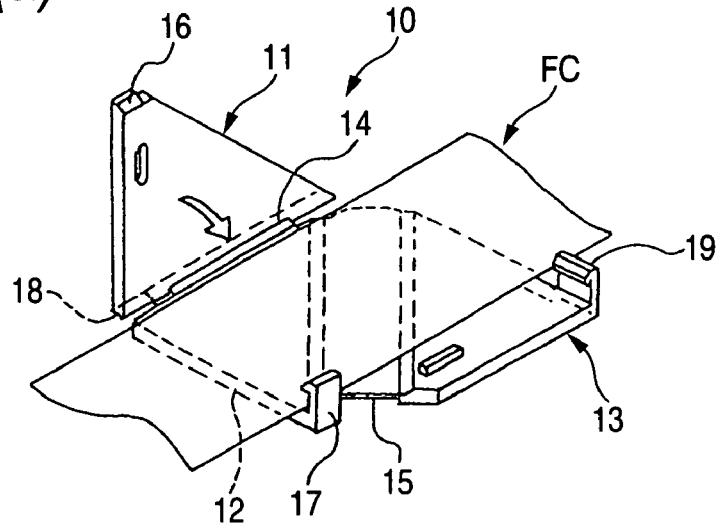
Figure 27:
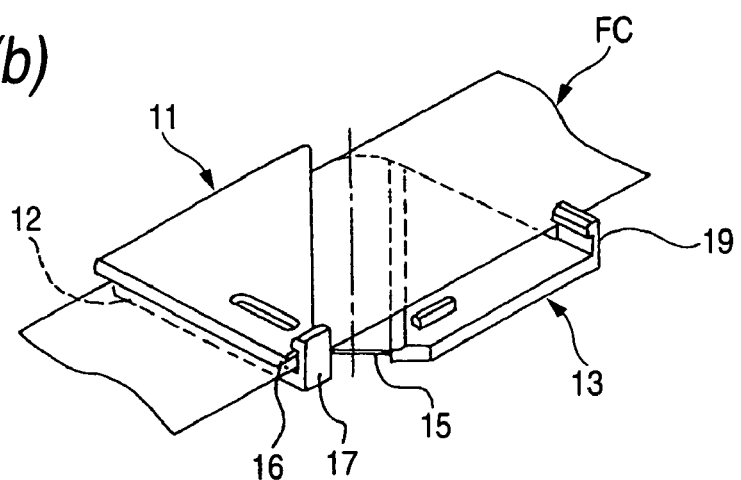
Figure 27:
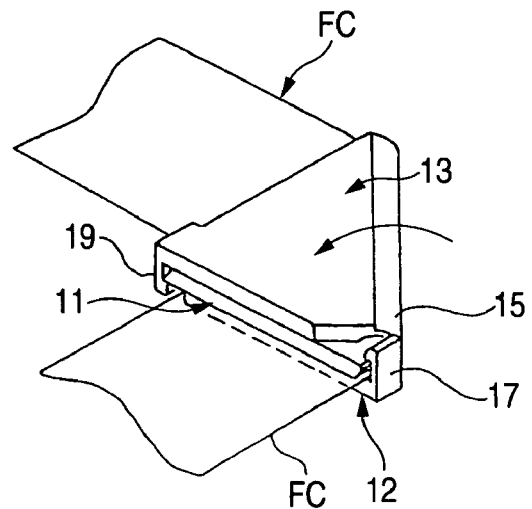

When the bending angle of the flat cable 30 is 120 degrees, as shown in FIG. 25, the flat cable 30 is inserted from the free end of the locking piece 232 to be brought into contact with the sidewall 231 and the positioning projection 236 of the third support surface 233c is inserted into the penetrated hole 31 of the flat cable 30 to position the flat cable 30 on the first support surface 233a.

At this time, the flat cable 30 is inserted among the base body 210, the locking piece 232 and the support plate 233 to be bent at the oblique side 211 of the base body 210 at 120 degrees, to be inserted into the gap between the base body 210 and the locking piece 232, to be brought into contact with the third locking surface 232c of the locking piece 232, to be inserted into the gap between the locking piece 232 and the support plate 233 and to be brought into contact with the third support surface 233c of the support plate 233.

The flat cable bending holder 20 for stably holding the flat cable which is bent at a predetermined angle is fixed to the interior of a vehicle by any fixing means (not shown) using the surfaces opposite to the support surfaces of the support plates 223 and 232 or the surfaces opposite to the locking surfaces of the locking pieces 222 and 232 as an attachment surface. By increasing the size of the attachment surface, the holder is easily attached.

Accordingly, the flat cable bending holder can bend the flat cable at a plurality of bending angles.

In this holder, the flat cable can be accurately fixed and held at a predetermined angle using the repulsive force of the bent flat cable. That is, the bent flat cable rebounds in a direction for expanding the bending angle (in a direction denoted by a white arrow of FIG. 23). However, in this holder, since the flat cable is prevented from expanding outward by the sidewall 221 of the entrance-side holding portion 22 and the wire contact portion 238 of the exit-side holding portion 23 (or the sidewall 231), the bending angle of the flat cable is accurately equal to the angle defined by the sidewall 221 of the entrance-side holding portion 22 and the wire contact portion 238 (or the sidewall 231) of the exit-side holding portion 23. Since the free ends of the locking piece 222 of the entrance-side holding portion 22 and the locking piece 232 of the exit-side holding portion 23 are opened to face each other, the flat cable inserted from the free ends does not exit from the free ends by the repulsive force.

In this holder, since the positioning projections 226 and 236 are provided on the support surface of the support plate 223 or the support plate 233 and inserted into the penetrated hole of the flat cable to position the flat cable, a separate tool for positioning the flat cable on the holder is not required.

In this holder, since the locking projection portion 237 is provided on the locking piece 232 of the exit-side holding portion 23 and the projection portions 225 and 235 are provided in the vicinity of the free end of the locking piece 222 or the locking piece 232, it is possible to prevent the flat cable from exiting from the holder.

In this holder, since the locking surfaces of the locking piece 232 or the support surfaces of the support plate 233 taper and the step differences are formed by the locking projection portion 237 or the wire contact portion 238, it is possible to decrease the thickness of the locking piece 232 or the support plate 233.

In this holder, since the wire passing grooves corresponding to the shape of the flat cable are provided in the locking surfaces of the locking pieces 222 and 232, the front end of the oblique surface 212 of the base body 210 and the front end of the support plate 233, it is possible to stably hold the flat cable.

Although the bending angle of the flat cable is set to 60 degrees, 90 degrees and 120 degrees therein, the size or the number of the bending angles is not limited thereto.

Although the penetrated hole is provided in the flat cable and the positioning projection is inserted into the penetrated hole, the positioning projection may be inserted into an insulator of the flat cable to position the flat cable.

The present invention is not limited to the above-described embodiment and various alterations, modifications or combinations of the embodiments may be made. The materials, the shapes, the dimensions, the numerals, the aspects, the number, the disposed positions of the components of the above-described embodiment are exemplary and are not limited thereto.

What is claimed is:

1. A flat cable bending holder, comprising:
a plate which has a straight-line shaped bending reference side for bending a flat cable at an outer edge of the plate and wherein a portion of the flat cable that is located before the bending reference side is mounted on a front surface of the plate and a portion of the flat cable that is located after the bending reference side is mounted on a rear surface of the plate;
holding pieces which are provided on the front surface and the rear surface of the plate and hold the portions of the flat cable located before and after the bending reference side along the front surface and the rear surface of the plate, respectively; and
restricting portions which are provided on the plate and are positioned at outer edges of the portions of the flat cable located before and after the bending reference side and which extend at a predetermined narrow angle to restrict an angle at which the flat cable enters and exits the flat cable bending holder.

2. The flat cable bending holder according to claim 1, wherein at least one of the holding pieces is provided as a pinch plate for pinching the flat cable between the at least one holding piece and the plate and is cantilever-supported by a support portion which is provided on at least one of the restricting portions in such a way as to provide a gap for allowing the flat cable to be inserted between the plate and the at least one holding piece, and
wherein an insertion slot for inserting the flat cable between the at least one holding piece and the plate is formed at a free end of the at least one holding piece.

3. The flat cable bending holder according to claim 2, wherein a positioning projection which is engaged with a hole formed in the flat cable is provided on the plate to position the flat cable in a longitudinal direction.

4. The flat cable bending holder according to claim 2, wherein a groove into which a convex portion of the flat cable is inserted is formed on a lower surface of the at least one holding piece.

5. The flat cable bending holder according to claim 2, wherein a removal preventive projection for preventing the flat cable inserted between the plate and the at least one holding piece from being removed through the insertion slot is provided on the insertion slot or as an extension of the insertion slot.

6. The flat cable bending holder according to claim 1, wherein at least one of the holding pieces is provided as a penetration plate which penetrates through a penetrated hole formed in the flat cable and positions and holds the flat cable in a longitudinal direction,
wherein the at least one holding piece is cantilever-supported by a support portion which is provided on at least one of the restricting portions in such a way as to provide a gap for allowing the flat cable to be inserted between the plate and the at least one holding piece, and
wherein an insertion slot for inserting the flat cable between the at least one holding piece and the plate is formed at a free end of the at least one holding piece.

7. The flat cable bending holder according to claim 6, wherein grooves into which a convex portion of the flat cable is inserted are formed in an upper surface and a lower surface of the at least one holding piece.

8. The flat cable bending holder according to claim 6, wherein the free end of the at least one holding piece is formed with a comb-shaped cross-section.

9. The flat cable bending holder according to claim 6, wherein a removal preventive projection for preventing the flat cable inserted between the plate and the at least one holding piece from being removed through the insertion slot is provided on the insertion slot or as an extension of the insertion slot.

10. The flat cable bending holder according to claim 1, wherein the plate has an L shape having a pair of sleeve portions on which the portions of the flat cable that are located before and after the bending reference side are mounted, respectively,
wherein an outer corner of the L-shaped plate is cut in an oblique line, and an edge cut in the oblique line is formed as the bending reference side having a length equal to or larger than a length of a bend in the flat cable.

11. The flat cable bending holder according to claim 10, wherein a tape-winding concave portion for winding a tape onto the flat cable and the sleeve portion is provided in at least one of the pair of sleeve portions.

12. The flat cable bending holder according to claim 1, wherein mounting surfaces for stably mounting the flat cable bending holder onto a flat mounted surface have a height equal to or larger than that of the holding pieces and are provided on the front surface and the rear surface of the plate.

* * * * *